United States Patent
Spensberger et al.

(10) Patent No.: US 9,347,497 B2
(45) Date of Patent: May 24, 2016

(54) COUPLING WITH COUPLING RING ON TWO COUPLING PARTS, AND ASSOCIATED COUPLING RING

(71) Applicants: Johann Spensberger, Rabenau (DE); Eberhard Haedrich, Pesterwitz (DE)

(72) Inventors: Johann Spensberger, Rabenau (DE); Eberhard Haedrich, Pesterwitz (DE)

(73) Assignee: KWD PUPPLUNGSWERK DRESDEN GMBH, Dresden (DE)

( * ) Notice: Subject to any disclaimer, the term of this patent is extended or adjusted under 35 U.S.C. 154(b) by 0 days.

(21) Appl. No.: 14/346,313

(22) PCT Filed: Sep. 18, 2012

(86) PCT No.: PCT/DE2012/000936
§ 371 (c)(1),
(2) Date: Mar. 20, 2014

(87) PCT Pub. No.: WO2013/041082
PCT Pub. Date: Mar. 28, 2013

(65) Prior Publication Data
US 2014/0231210 A1    Aug. 21, 2014

(30) Foreign Application Priority Data

Sep. 20, 2011 (DE) .................. 20 2011 105 999 U
Sep. 20, 2011 (DE) .................. 20 2011 106 000 U

(51) Int. Cl.
*F16D 3/68* (2006.01)
*F16D 11/00* (2006.01)
*F16D 3/18* (2006.01)

(52) U.S. Cl.
CPC .............. *F16D 11/00* (2013.01); *F16D 3/185* (2013.01); *F16D 3/68* (2013.01)

(58) Field of Classification Search
CPC ........... F16D 11/00; F16D 3/185; F16D 3/68
USPC .......................................................... 464/85
See application file for complete search history.

(56) References Cited

U.S. PATENT DOCUMENTS 8,651,966 B2 * 2/2014 Mistlbauer .................... 464/85

FOREIGN PATENT DOCUMENTS

| DE | 38 43 496 C1 * | 4/1990 |
|---|---|---|
| DE | 196 39 304 A1 | 3/1998 |
| DE | 29522268 U1 | 4/2001 |
| DE | 202004003933 U1 | 6/2004 |
| DE | 202005015769 U1 | 2/2006 |
| DE | 202009015790 U1 | 4/2010 |
| DE | 10 2010 005 255 A1 * | 7/2011 |
| GB | 377454 | 8/1931 |

* cited by examiner

*Primary Examiner* — Gregory Binda
(74) *Attorney, Agent, or Firm* — Horst M. Kasper

(57) ABSTRACT

A coupling (30, 49, 61; 40, 60) with a coupling ring (1) on two coupling parts (8, 9), wherein the coupling parts (8, 9) each constitutes a star (2, 3) with star arms (26, 27) and star arm end regions (4, 5) situated thereon, wherein the two stars (2, 3) are arranged opposite and axialy relative to one another with an angular offset, and the star arm end regions (4, 5) are provided with in each case at least one threaded bore (14) for screw connections (20), wherein the coupling ring (1) includes plurality of fastening elements (10, 11).

36 Claims, 15 Drawing Sheets

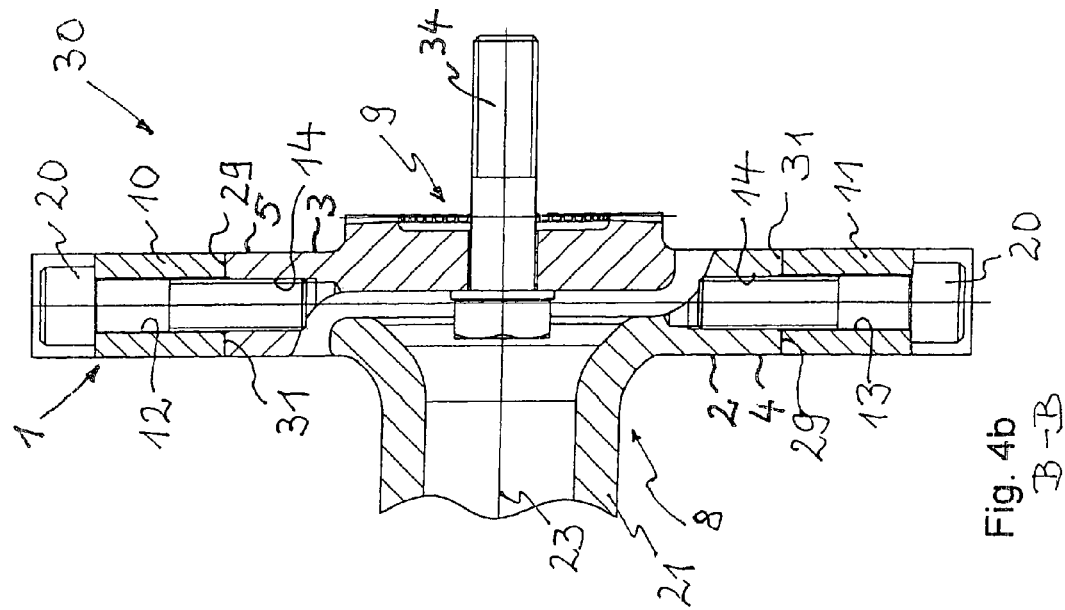
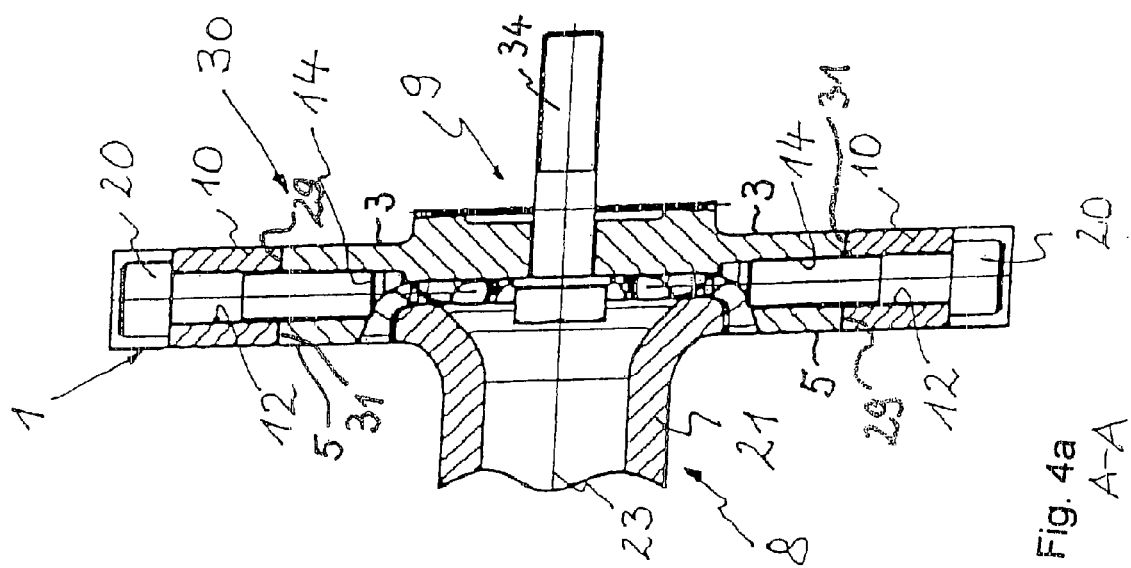

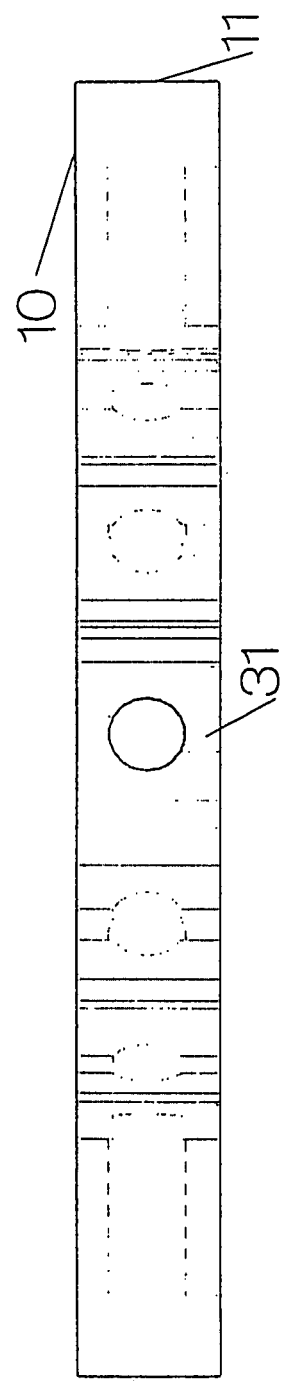

COUPLING WITH COUPLING RING ON TWO COUPLING PARTS, AND ASSOCIATED COUPLING RING

BACKGROUND OF THE INVENTION (1) Field of the Invention

The invention relates to a coupling with a coupling ring on two coupling parts and also to an associated coupling ring.

A description of the specifications concerning the flexible joint coupling with a coupling mounted between two coupling parts, which, in turn, consists of an integrated coupling ring made up of separately vulcanized rubber-wedge metal parts to provide for fastening along the ring and are intermeshed with the coupling parts, is provided in the publication DE 196 39 304 A1. The metal parts of the coupling ring are solely composed of wedges which are evenly arranged along the radial direction of the dimensions and cover the entire shaft-width. Vulcanized rubber blocks, which are already mounted in line with the direction of the dimension, are integrated between the wedges against a pre-tensioned pressure bar. The coupling ring may be composed either of individual segments including at least one rubber block and both-sided vulcanized metal parts to be respectively connected in the form of wedges.

The screw connections between the coupling parts and the coupling ring positioned in between it are axially aligned in order to fit with the design of the coupling axis.

The fastening of the coupling ring and mounting as well as the dismounting of the coupling parts may involve some difficulties and additional efforts due to the inevitable requirement of an appropriate mounting device and—site in order to carry out implementation of the axial screw connections.

(2) Description of Related Art Including Information Disclosed Under 37 CFR 1.97 and 1.98

In addition to the above-mentioned, the publication DE 20 2004 003 933 U1 includes a description of the flexible ring coupling with its integrated coupling drive element, which primarily consists of a shaft-shaped coupling part made of flexible material, i.e. rubber in particular, whereas the connection of the shaft-shaped coupling part and its metallic element are vulcanized with bore holes to provide for a reach-through for each one of the coupling parts. However, the shaft-shaped coupling element is split within, at least, one of the metal parts with the gap being formed in doing so ensuring for the secure operation of the coupling with respect to the stability and fastening.

This means, that, at least, one fixing device needs to be mounted in line with the split metal part.

The shaft-shaped coupling element has vulcanized spring parts coming as fastening elements for mounting with both the radially and axially directed bore holes. The shaft-shaped coupling with its radially aligned bore holes is only fastened to that single coupling part which is radially aligned to the screwing connections. The bore holes are connected with axially aligned screw connections and, in so doing allow for the connection of the shaft-shaped coupling part with the other coupling element. With the radial borehole shape on the one hand, and the axial borehole shape of the shaft-shaped coupling part on the other hand, it is possible to provide for a radial-axial connection between the coupling parts, which are fastened to the coupling part. In cases, where the connection is supposed to be optionally mounted on the basis of a radial shape, the shaft-shaped coupling part needs to be splitted into at least two segments, which are to be assembled into the shaft-shaped coupling part during the mounting process.

The fastening of the coupling ring and mounting as well as the dismounting of the coupling parts may involve some difficulties and additional efforts due to the inevitable requirement of an appropriate mounting device and an assembly stand in order to carry out implementation of the axial screwing operation.

Please refer to the document GB 377 454 A for a description of a flexible ring coupling with two coupling parts and consisting of flexurally rigid arms providing for a range that allows for the positioning of parent parts which are in-vulcanized on both sides, whereas said parts are crimped between the arms by means of adjustable, radially screw-mountable metal plates, which are fastened to the external side edges of the flexible material wedges.

In doing so, the flexible material wedges are mounted between the opposing coupling parts, which would, thus be positioned between the arms with the flexible material wedges are segments with parent parts which are vulcanized on both sides and inserted into the radially guided recesses of the arms.

During the mounting process, the opposing parent parts of two adjacently positioned material wedges are supported by the respective coupling part's arm, whereas the parent parts are radially fastened to and supported by the arm, which is, in turn, made up of a metal plate provided with two holes. The adjustment of the static pressure is made by means of radial screw joints which are mounted vertically to the peripheral end ranges of the arms, as these are, when viewed from their end ranges, provided with two radially aligned threaded holes.

The wedge-shaped metal fastening elements usually consist of three parts and become one by the assembly of the both parent parts of the respective adjacent flexible material wedges and the metal plate, which is provided with two holes to allow for the radial screwing with the two radial threaded holes of the arms, so that the parent parts of the flexible material wedges are pressed in a radial way into the recesses (notches), of the respective coupling part's arms.

The flexible material wedges are connected with the parent parts on both sides and are designed in a cuneiform shape in order to fit with the ring axis. The elastic material wedges and their corresponding material wedges are segments, i.e. the material wedges bonded with their parent parts are segments, which are inserted between the notches of the staggered arms of the coupling parts and remain in that position after the completion of the mounting. However, this alone is not sufficient to meet the requirements of a consistent, unsplitted shaft. This is, because the segments are, in a first assembly step, inserted between the arms and, whilst being supported by the parent parts and, in the second step, conveyed in a bridge-like way to one of the coupling rings by means of the screw connection. That way, the bridge-like joining provides for a coupling ring without the need of a separate coupling ring in place.

A description of a wedge-integrated coupling with a standard shaft-shaped coupling element can be found in the document DE 20 2009 015 790 U1, whereas the shaft-shaped coupling element consists of many different rubbery-elastic segments. The segments have integrated fastening elements with mounting holes to be aligned with a driven machine assembly part as well as in-vulcanized parts that provide for a reduction of the elasticity.

Said segments are adjoined to each other by means of hinged-like connection parts and, in so doing, form a single-parted, radially extendable, shaft-shaped coupling element, which in turn, consists of segment-aligned radial and axial screw joints as well as of a hinge, which is mounted between two segment halves.

As is described in the specifications, the self-contained coupling element consists of at least two ring parts/ring segments and an integrated hinge joint, i.e. it is not subjected to the vulcanization process in full and, hence, not formed as a coherent, self-contained coupling ring. Hence, the design of the coupling ring is not intended to serve as a coherent, thus a whole and non-segmented coupling ring solely comprising of radial screw joints. The assembly requires an appropriate mounting device.

The document DE 295 22 268 U1 includes a description of a transverse drive integrated into a motor, whose rotor shaft runs in parallel to the drive axis of a rail vehicle which is connected with an axle drive. The axle drive consists of a bevel quill ring enclosed by a wedge-shaped ring, which is, partly, guided through the bevel quill ring. The rotor shaft with its power take-off end is coupled with the wedge-shaped ring by means of a motor-drive coupling, whereas the motor power take-off end is designed as both an angularly elastic and axial coupling.

The wedge-shaped ring is coupled with the bevel quill ring by means of a gear drive coupling. The wedge-shaped ring is provided with an axial end-fastening using spiral springs, which make for the wedge-shaped ring's rebound to its mid-position to the bevel quill ring in the event of a misalignment.

The coupling itself does, hence, not comprise of a whole, non-segmented coupling ring. A self-contained, integral coupling ring without any screw joints that may be fastened to the coupling parts is not provided.

The document DE 196 39 304 A 1 contains a description of a flexible resp. elastic joint coupling with a spacer shaft which is aligned between two coupling flanges, whereas the spacer shaft consists of separately vulcanized rubber-wedge metal parts to provide for an fastening along the coupling and are intermeshed with the coupling flanges.

The metal parts of the spacer shaft consist solely of evenly arranged wedges, covering the entire shaft width in radial direction starting from the peripheral edge. Vulcanized rubber blocks, which are already mounted in line with the direction of the dimension are integrated between the wedges against a pre-tensioned pressure bar.

This is the concept serving as the design for a coupling ring consisting of segments whose screw-joint is intermeshed in such a way that it forms coupling ring element, and, by means of the axial screw joint, connect with the intermeshed arrangement of the coupling hubs' arms. The implementation of a self-supporting coupling with an optionally radial screw-joint is not possible. Also in this case, the assembly of the coupling ring element should only take place using appropriate mounting device.

Furthermore, the publication 20 2005 015 769 U1 contains a description of a double joint coupling consisting of two joint planes and, thus, two coupling joints which are connected through a shaft, with one of the joint planes is aligned to a gear coupling joint with intermeshing which provides for an angular and axial compensation. The other joint plane is aligned to a torsion-proof, flexile coupling joint.

Conventional gear couplings with an integrated intermeshing for the torque transmission are used to connect a driving shaft in order to compensate the axially-parallel, axial, or angular shifts that may occur between the both shafts.

Conventional torsion-proof, flexile couplings, such as all-metal couplings are characterized by their capability of compensating possibly occurring misalignments by means of a spring mechanism. This comes along with the advantage that they provide for both a long life fatigue strength and freedom of maintenance. Yet, the elastic-plasticity level is quite low, which, in turn, results in more frequently occurring misalignments, so that the axial shifting clearance is rather restricted.

A description of another double joint coupling in the design of a transverse drive with an integrated motor can be found in the publication DE 295 22 268 U1. In this case, the rotor shaft of the motor runs in parallel to the driving axis of a rail vehicle and is connected with an axle drive, which consists of a bevel quill ring that encloses a wedge-shaped ring with parts of it running right within the bevel quill ring. The rotor shaft with its power take-off end is coupled with the wedge-shaped ring. The motor's power take-off coupling design comes as with both forms of elasticity, i.e. an angular and axial coupling. Using a gear drive coupling and a connection with the bevel quill ring, the wedge-shaped ring has an axial fixture, which is supported by coil springs at its end ranges with the coil springs providing for the wedge-shaped ring's rebound back into its mid-position, i.e. the bevel quill ring. Difficulties or problems may arise from the direct connection of the wedge-shaped ring with the bevel quill ring, whose intermeshing-mechanism does not allow for any replacement of the coupling joint's parts in the event of a defect or the like.

DETAILED DESCRIPTION OF THE INVENTION

The invention is based on the concept to provide for a coupling with an integrated ring to be mounted onto two coupling parts and their corresponding coupling ring with the assembly process of the coupling being simplified by way of the design that is based on a simple, single-parted shaft allowing for the simultaneously implementation of the vulcanization process and, hence, enables the screwing as such part unto the detached end ranges of the front arms.

The solution for this task is provided by means of patent claims 1 and 25. The coupling with its ring on two coupling parts are each fitted with a star unit including star arms in the front, whereas the two star units are arranged in an opposing and axially angular manner, while the star arms in the front are each provided with at least one threaded hole for the screw joints, whereas the following needs to be considered:

several fastening elements should being radially directed, i.e. towards the axis and arranged around the coupling ring providing at least one solid bores towards the axis whereas the solid bores are supposed to provide for at least one radially aligned screw joint, i.e. towards the fixture of the fastening elements at the threaded bore holes, which are, in turn, radially aligned to the ring axis of the front star arms, which are arranged in an intermeshed manner with respect to the star unit, at least, one elastic spring element must be provided between the ring-revolving and adjacently arranged fastening elements, the fastening elements of the coupling rings must provide at least one axial surface which is directed and in line with the front star arms as this is particularly important for the assembly. This is, where the specifications set out in patent claim 1 come into consideration, as the fastening elements fitted with the coupling ring are part of each of the end ranges belonging to the front star-area of the star unit, which is usually mounted in one of the mid-positions of the gripping arms, whereas the end ranges exhibit a surface aligned towards the fastening elements with a touching connection to the surface at the internal end range of the respective fastening element with the ring-revolving, alternating arrangement of the fastening elements and the elastic spring parts, which are each fastened to their adjacently arranged fastening elements by means of a simultaneously implemented vulcanization process, form a single coupling ring in the course of a single and simultaneously implemented vulcanization process, and which is, as a whole, screwed onto the two axially shifted star arm units, the coupling is supposed to provide for an elastic, wholly formed coupling ring and allows for the formation of a consistent, tangential initial tension, whereas the tangential generation of the initial tension is intended to serve the operation of the two angularly aligned, opposing star units of the coupling parts.

The fastening elements, which are to be aligned towards the ring axis can be formed in a wedge-shaped manner (which would be the preferable form) and consisting of metal parts. However, the fastening elements can as well consist of other solid materials. Besides, the fastening elements maybe made up of different shapes; this applies also to the spring parts, while the shapes of both parts are always arranged in line with the ring's circumference.

The surfaces of the star arm units may either exhibit an axially aligned surface with an integrated profile which is to be mounted underneath the profiles' surface of the respective fastening element, thus at the narrow wedge-shaped end range before the assembly process takes place with both surfaces contacting each other during the assembly process.

The profiles of the fastening elements' surfaces as well as the surfaces belonging to the star arm facing area based on a coherent, positive-locking design. Besides, said profiles may consist either of a notch or spring, while the profiles of the surfaces belonging to the front of the star unit may be either a correspondingly positive-locking spring or a notch.

The design profile of the fastening elements may either be composed of a coupling gear system based on wedges or gear with the profiles of the surfaces belonging to the front arm star units providing for an appropriately fitting coupling gear system.

The profiles of the fastening elements' surfaces belonging to the front arm units are, thus, available with correspondingly frictional connections.

With regard to this, the profiles of the fastening surfaces as well as the profiles of the front arm star units may be designed as a correspondingly matching, thus even, or correspondingly matching, thus bent or topographic shape, which would contact each other during the implementation of the assembly.

The fastening elements can be supported by additional means to the front arm star units using pins and fitting bolts.

All fastening elements consisting of metallic compounds may exhibit (preferably) external insertions/clearances, which are either composed of a (recess) notch or a counter-bore for the radially aligned screw joints, which are respectively positioned in the external end range of the shaft.

The spring parts are composed either of elastic material, in particular rubber or provide a (preferably) evenly designed supporting plate which is aligned to the ring axis.

The connection of the bolts with the front arm star unit is either fastened to—depending on the fastening element of the coupling ring—so that one of the star units provides for a connection of the adjacent fastening element's opposing part with the front arm star unit of one star unit and its opposing star unit, whereas the next one would require another fastening element to be connected to the star unit of another front arm star which, in turns provide for a continuous, thus ring-revolving fastening of the coupling ring on the coupling parts.

The coupling with its integrated ring on two coupling parts comes in the form of a double joint coupling with at least one of the coupling parts being fastened to a ring which is connected to a gear coupling with an integrated intermeshing, i.e. gear system, or coming in the form of just one coupling ring of the same kind, which is connected to the shaft of a coupling and compliant to the coupling ring's specifications of the invention resp. comparable to the gimbal mounting options by means of another coupling which is connected to a shaft.

The coupling with its integrated coupling ring on two coupling parts, may as well be used along with a double joint coupling consisting of two joint planes and including two couplings which are connected through a shaft with the joint plane of one spherical gear system, which is aligned to the requirements of an angular and axial compensation clearance.

As to that, the spherical gear system is provided with a bushing that comes with an internal gear system, an inter-mountable coupling hub and corresponding external gear system, with the primary shaft being fastened to the inter-mountable coupling hub and the other joint plane of the coupling with its integrated ring being aligned to two coupling parts.

The coupling has an integrated coupling ring designed in an unsplitted and non-segmented shape, which is integrated into the fastening- and spring parts, yet, it also serves the purpose of generating a pre-tensioning on two angularly displaced, opposing star units with their front star arm units being axially staggered to the mid-position of the front star arm units that provide for, at least, one threaded bore hole for screw connections. In turn, one of the each coupling ring axes is designed in alignment with the front star arm units and as an axially shaped profile with one of the star units being assigned to a coupling part positioned at the driving end and another star unit being aligned towards the output end with said profile being composed of several (preferably) cuneiform fastening elements made of metal, which are arranged around the ring, thus aligned towards the axis of the coupling ring and included in a continuous bore, of which at least one of them is directly aligned in radial direction to the ring axis to provide for the fixture of the fastening elements to the radially aligned threaded bore holes of the front star arm unit's double-end star units along the fastening elements of the coupling ring, whose profile is aligned in axial direction towards the ring axis, which is arranged in line with the profile of the front star arm units when locked into position during the assembly process, the ring-revolving adjacently positioned fastening elements which are each provided with an elastic spring element bonded to said parts during the vulcanization process, so that a ring-revolving two-sided arrangement of the metallic cuneiform fastening elements and the elastic spring elements provides for the formation of a wedged-shape coupling ring, which can be screwed, as a whole, onto the both axially shifted star front-faced arms of the two-sided star units.

The coupling ring can either be a combination of fastening elements and in-vulcanized spring parts, whereas both the fastening elements and the spring parts may exhibit variances with respect to the shape, i.e. with (preferably) wedge-shaped fastening elements aligned to the ring axis, the spring parts are usually designed in a cuboid shape.

The elastic coupling with its integrated coupling ring is usually designed in a gimbal shape.

Two elastic couplings may be designed in the form of a double-gimbal coupling connected through a corresponding shaft.

The intermeshed gear coupling may be replaced by means of a membrane coupling or a ring disk coupling.

The arrangement of the two couplings in their joint planes can be mounted as well into the internal as into the external area of the wheelset in rail vehicles. The fields of application with respect to the couplings are not limited to rail vehicles.

According to the invention, the coupling ring for the above-mentioned couplings is, in accordance with patent claim 25 hereof, must with respect to the fastening parts, consist of a whole, thus non-segmented coupling ring, whereas > several, ring-revolving fastening elements, which are axially aligned towards the coupling ring fastening elements with, at least one of them, exhibiting a continuous bore with a straight radial alignment towards the direction of the ring axis. In this case the continuous bore holes must be provided for at least one straight radial alignment going out from the external ring surface and allowing for a screwing connection to fix the fastening elements onto two fitted coupling parts of one coupling,
> 
> the fastening elements of the coupling ring fixed in the internal ring surface must be provided each with an axial profile running along the direction of the ring axis,
> 
> one elastic spring element must be provided between each of the ring-revolving, adjacently arranged fastening parts, and is, in turn, fixed to them by means and in the course of a vulcanization process. The latter process must take place in parallel with the fixing procedure,
> 
> in order to provide for both a connection and the formation of a coupling ring taking place in the course of the ring-revolving, dual arrangement of the fastening elements and the elastic spring parts during the vulcanization process, which is finished in parallel to the above-mentioned process, and is then, as a whole part, ready to be screwed onto the two coupling parts which are fixed on top of the coupling ring.

The fastening elements can either exhibit a (preferably) wedge-shaped and metal-sealed joints, which, in turn, provides for a coupling ring supported by an arrangement of wedges.

Due to the finishing surface of the wedge arrangement around the external ring section, which is fixed with the fastening parts, the screw heads of the corresponding joints may protrude beyond the external ring surface.

This can be prevented by providing the fastening elements used for the fixture to the wide wedge-shaped end range with (preferably) external insertions/clearances, which can be done either by means of a countersink notch or a counter bore. These must, however, be suitable for the radially arranged screw-joints so as to ensure for an appropriate countersink.

In addition to the wedge-shaped formations, the fastening elements may also be made up of other shapes and forms. The same applies to the elastic spring elements, whose fastening elements may also exhibit various shapes and forms which are in line with their respective shape.

The elastic spring elements consist of elastic material, (preferably) rubber.

The elastic spring elements exhibit at least one supporting plate, which must be aligned along the direction of the ring axis. The radially aligned supporting plates can each be arranged in the center of the spring element. The supporting plates can either be designed in the shape of parallel surfaces or in the shape of a wedge which is aligned towards the ring axis. Apart from this, the spring elements can exhibit a ring axis with at least, one radially and/or axially concave center mounted in alignment with it. If the latter case applies, one of the supporting plates must be provided with dual a concave center at both the external and internal area of the ring axis belonging to the respective part of the spring element. Moreover, its movement behavior may be oriented towards the radial direction of the ring axis, whereas the spring element must be arranged in line, thus, at the sides of the radially aligned concave center parts.

Deviations, improvements, and specific designs of the inventions will be outlined in additional independent claims.

BRIEF DESCRIPTION OF THE SEVERAL VIEWS OF THE DRAWINGS

The invention is explained and described in detail by means of design examples by means of several drawings.

Figure 1:
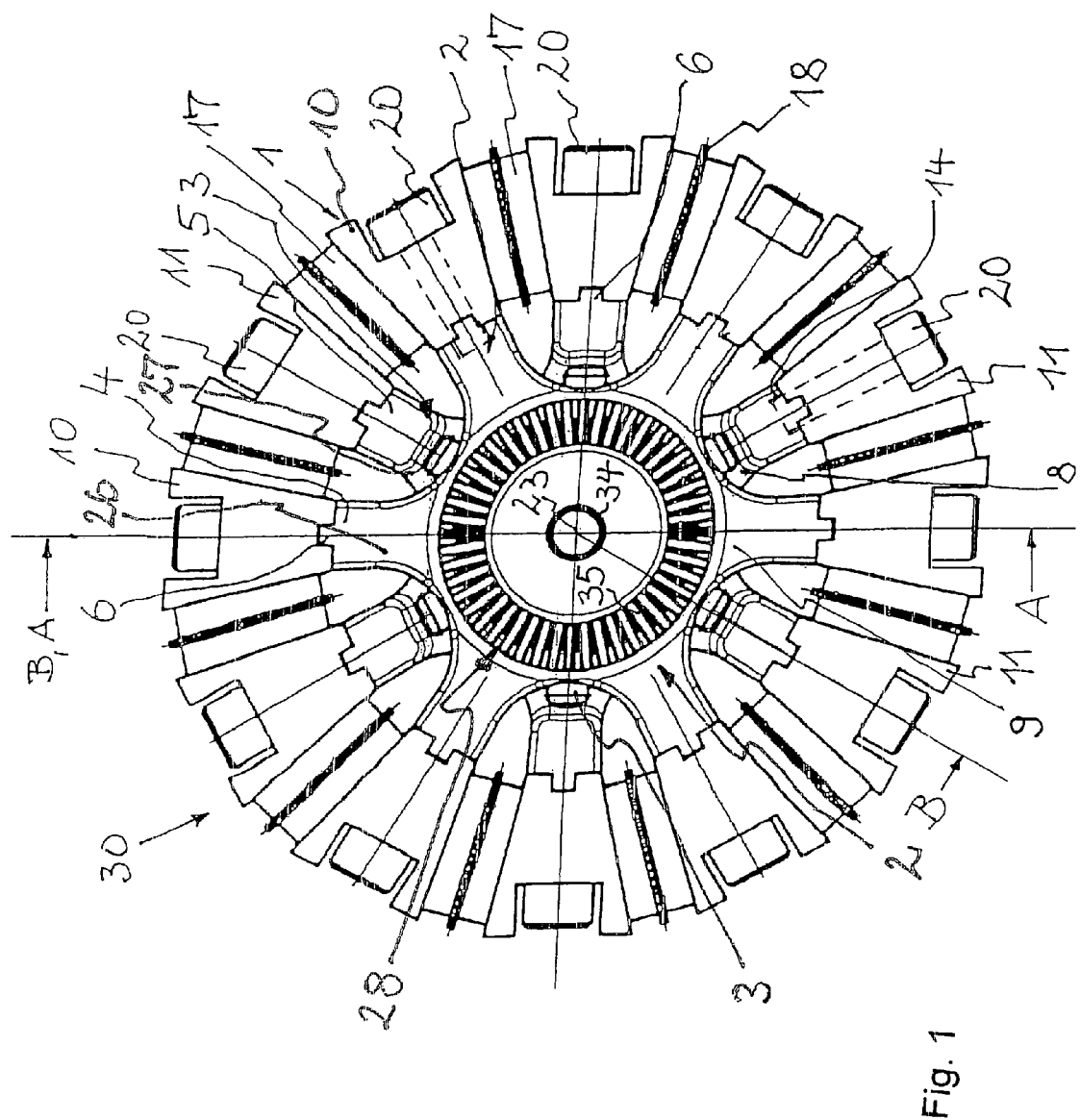
FIG. 1 a depiction of the design in accordance with the invention showing the axial screw joints, thus the coupling along with its coupling ring and solely radially aligned screw joints along the both star's front facing areas belonging to the coupling parts of the coupling, FIG. 2 a perspective view on the coupling ring in accordance with the invention of the coupling ring's design, FIG. 3 a depiction of the coupling ring aligned towards the direction of the axis without coupling parts based on the description as set out in FIG. 2, FIG. 4 *a* a depiction of the cross-sectional view of A-A based on FIG. 1, with the star's front facing arm areas screwed with the coupling ring of said star, FIG. 4*b* a depiction of the cross-sectional view of B-B based on FIG. 1 with the star's front facing arm areas screwed with the coupling ring of said star, FIG. 5 a schematic depiction of an fastening element which is, on the basis of spring elements, flanged by a wedge-shaped fastening element provided with a spring in the internal area of the shaft with the design serving the purpose of adjusting the coupling ring to a notch onto one of the star's front facing arm areas of the external star, FIG. 5*a* a schematic view of a fastening element with a planar surface of the fastening, element adjacent to a planar surface of the star front facing rea, FIG. 6 a schematic depiction of a fastening element, which is on the basis of spring parts, flanged by a wedge-shaped fastening element provided with a notch in the internal area of the shaft, i.e. at its narrow, wedge-shaped end with the design serving the purpose of adjusting the coupling ring onto one of the star's front facing arm areas of the external star using a spring, FIG. 6*a* a schematic view of a fastening element with a planar surface having dog teeth of the fastening element, FIG. 7 a schematic depiction of a wedge-shaped fastening element exhibiting a narrow, wedge-shaped and even surface to provide for a force-fit contact of the coupling ring to an even, external star front facing area of the external star area, FIG. 7*a* a schematic view of a fastening element with radially aligned screw-joint/ screwing operation, FIG. 8 a schematic depiction of a fastening element exhibiting a narrow, wedge-shaped and bent finish surface to provide for a force-fit contact of the coupling ring to a bent, external star front facing area of the external star.
Figure 2:
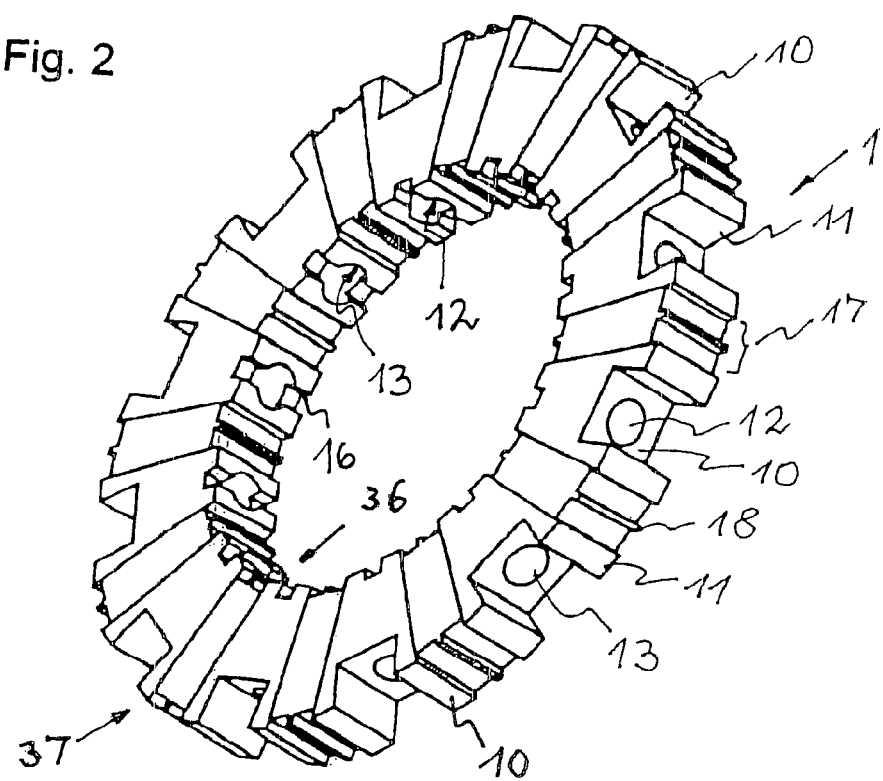
Figure 3:
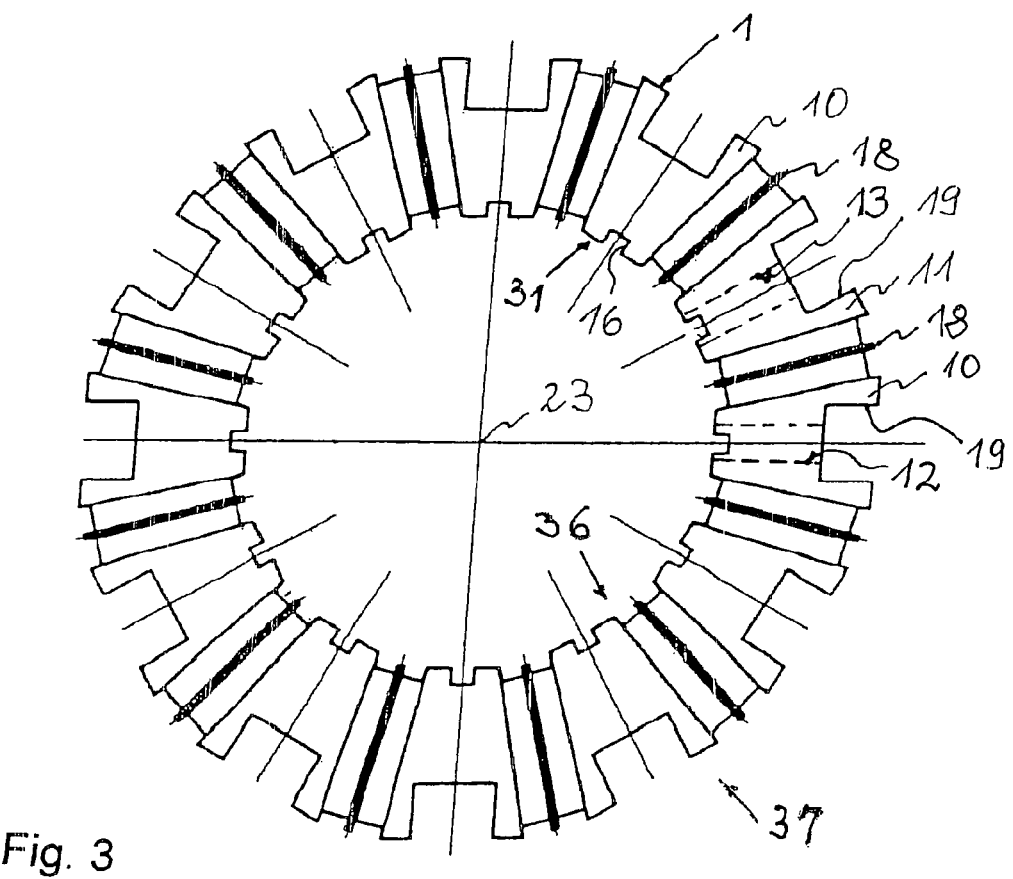

The following section provides an overview of the functionalities described in FIG. 1, FIG. 2, and FIG. 3.

Figure 15:
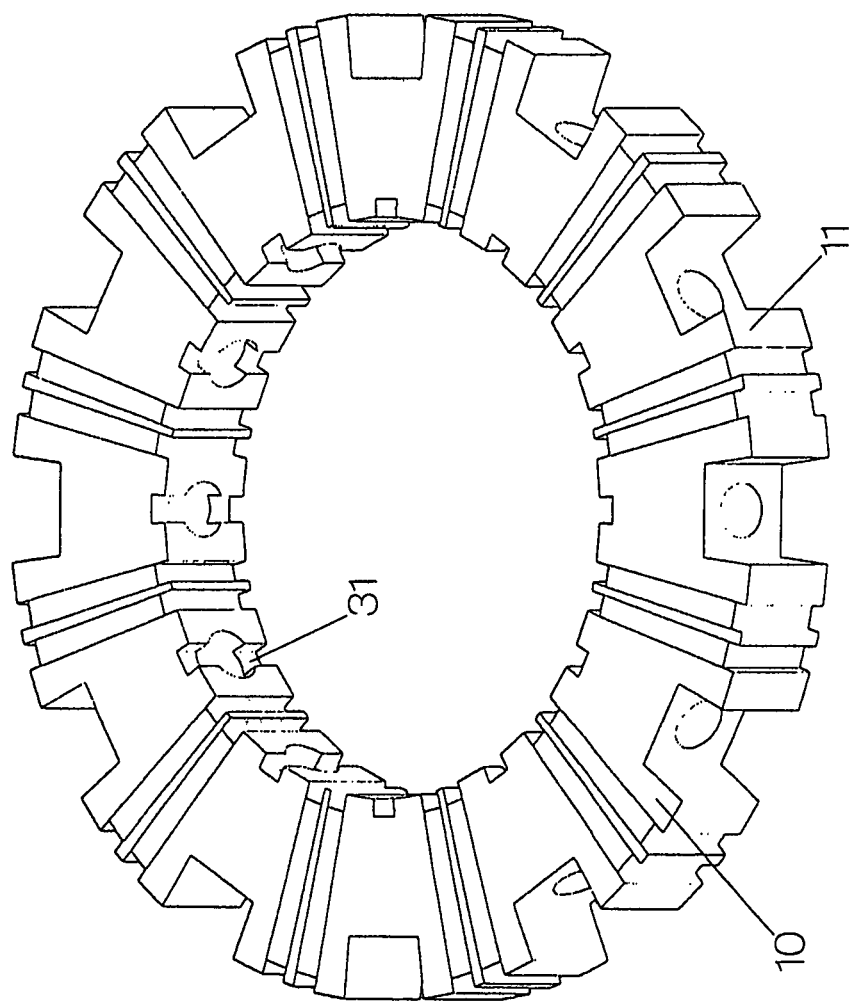

FIG. 15 shows another perspective view of a coupling ring.

FIG. 16 shows a side elevational view of a coupling ring.

The following section provides an overview of the functionalities described in FIG. 1, FIG. 2, and FIG. 3.

The coupling 30 depicted in FIG. 1 with the coupling ring 1 mounted on two coupling parts 8, 9—thus exhibiting one coupling component 8 at the driving end's gear and another one at the output's gear 9—, the coupling parts 8 and 9 are each provided with a star 2, 3 including star arms 26, 27 which are both provided with star front arm facing areas 4, 5, whereas the two stars 2, 3 are arranged opposed and axially, resp. angularly shifted to each other in coupling 30, and with the star front arm facing areas 4, 5 which are shifted to the star's center 28 each exhibiting at least one threaded borehole 14 for the screw-joints 20 provided for coupling ring 1, whereas coupling ring 1 comes (according to FIG. 2 and FIG. 3) with wedge-shaped, metal fastening elements 10, 11, which are aligned towards axis 23 of coupling ring 1 in a ring-revolving arrangement with each of them providing at least one directly radially aligned continuous bore 12,13 towards ring axis 23. The continuous bores 12, 13 provide for at least one of the directly radial aligned screw-joints 20 for the fastening of the fastening elements 10, 11 to the threaded boreholes 14, which are radially aligned to ring axis 23 belonging to the dual star arm facing areas 4, 5 as is shown in FIG. 1, each of the wedge-shaped fastening elements 10, 11 must (according to FIGS. 4a and 4b) exhibit one surface 31, which is axially aligned towards the ring axis 23, and which, in turn, must be positioned in line with one of the axially directed surfaces 29 of the star's front facing arm areas 4, 5 during the implementation of the assembly process, each one of the elastic spring elements 17 must be positioned between the ring-revolving adjacently aligned fastening elements 10, 11 (according to FIG. 1), which is, by means of a vulcanization process, it must be considered, that the ring-revolving rotational arrangement of the wedge-shaped fastening elements 10, 11 and the elastic spring parts 17 form a bogie-coupling whilst the implementation of a vulcanization process. Said coupling ring must be mountable as a whole onto the both axially shifted star's front facing areas 4, 5 at both ends, it must be made sure, that the coupling ring 1 constitutes (in accordance with FIG. 2 and FIG. 3) an elastically whole bogie-coupling, whilst allowing for a consistently tangential pretension, as is shown in FIG. 1, whereas said pretension is supposed to operate the two stars 2, 3 which are arranged opposed and axially shifted to each other towards the two coupling parts 8, 9.

The coupling ring 1 depicted without its components 8, 9 in FIG. 2 and FIG. 3 is designed as a consistent, whole, and non-segmented coupling ring to be mounted inside of the fastening elements 10, 11 and inside of the spring parts, whereas:

coupling ring 1 comes with several wedge-shaped, metal fastening elements 10, 11, which are aligned towards the radially aligned, continuous bore 12, 13 are part of the ring axis 23. Said continuous bores 12, 13 are intended for the sole purpose of providing for a fixing of the fastening elements 10, 11 by means of a direct radially aligned screw-joint to be implemented in the external ring section 37 onto the (as is shown in FIG. 1) fitted coupling parts 8, 9 of the coupling 30 so as to provide for a connection of the two coupling parts 8, 9 via coupling ring (1) whereas each of the wedge-shaped fastening elements 10, 11 of the coupling ring 1 in the internal ring section 36 must exhibit a profile 31 which is axially aligned towards the ring axis 23, each of the ring-revolving, adjacently arranged fastening elements 10, 11 must exhibit one elastic spring element 17, which is being fixed to the adjacent fastening elements 10, 11 during the implementation of a vulcanization process, with the ring-revolving, alternating arrangement of the metallic, wedge-shaped fastening elements 10, 11 and the elastic spring components 17, which are each fastened to their adjacently arranged fastening elements by means of a simultaneously implemented vulcanization process, forming a single coupling ring 1, and is, in turn, connected with the two coupling parts 8, 9.

FIG. 4a depicts a sectioning A-A (which is based on FIG. 1) of coupling ring 1, which is partly screwed together with the coupling ring 1 of the star's front facing areas 5 belonging to the star 3. Another depiction, as is shown in FIG. 4b shows a sectioning B-B (which is based on FIG. 1 of the same star's front facing area 4 of star 2 and the star's front facing area 5 of the other star 3 being screwed together with the coupling ring 1, whereas both sections A-A (lengthwise aligned section) and B-B (angularly aligned section) show the angular shift between star 2 of the coupling part 8 and the other star 3 of the coupling part 9 as is described in FIG. 4b in contrast to the coupling part 8, which is connected to a shaft drive 21, the coupling part 9 exhibits a fastening based on an adjustment screw 34 and a front-end gear shaft 35, which is fixed to the shaft drive (not included in the drawing).

The star front facing areas 4, 5 each belonging to a star 2, 3 and correspondingly fitted to the fastening elements 10, 11 of the coupling ring 1 depict (according to FIG. 5 and FIG. 6) the star arms 26, 27 (as is shown in FIG. 1), with their starting point at the end ranges of the star's 2, 3 mid-position 28. Said end ranges exhibit a surface 29, which is aligned towards the fastening elements 10, 11, which enables a connection to surface 31 at the wedge-shaped, narrow end range 32 of the wedge-shaped fastening element 10, 11.

The star's front facing areas 4, 5 of the stars 2, 3 may each exhibit an axially aligned surface 29 including a profile, which must be, prior to the screwing 20, positioned underneath the surface 31 with its profile, i.e. at the wedge-shaped, narrow end range 32 of the respectively assigned fastening element 10, 11, which, in turn, leads to a contact between the two surfaces 29, 31 during the implementation of the assembly.

The profiles of the surfaces 31 belonging to the fastening elements 10, 11 as well as the profiles of the surfaces 29 belonging to the star's front facing arms 4, 5 may exhibit a form-fit design at both ends.

Figure 5:
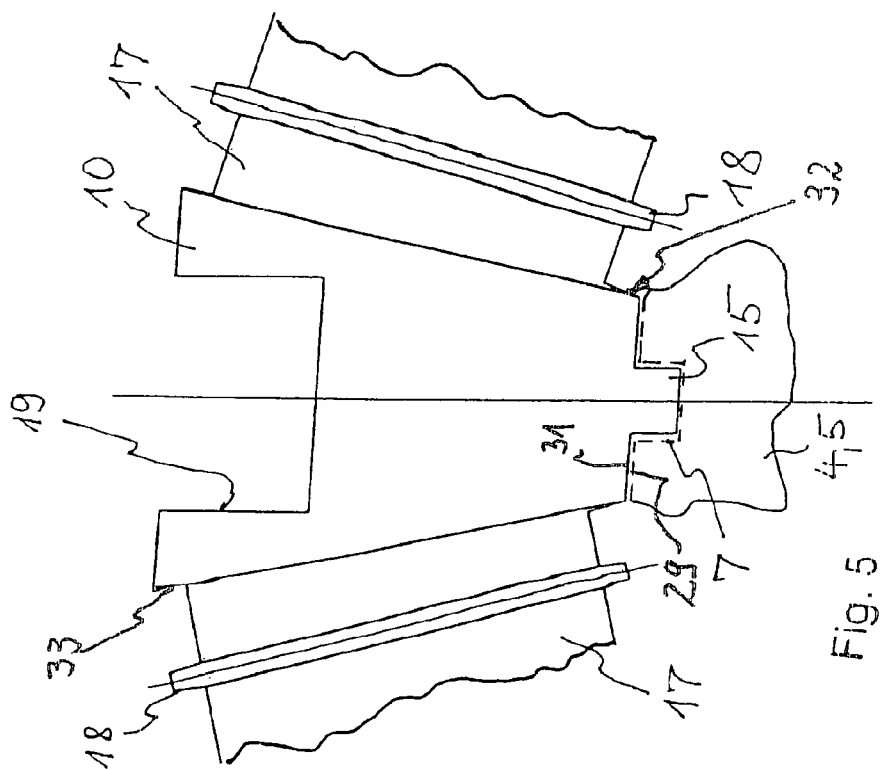
Figure 6:
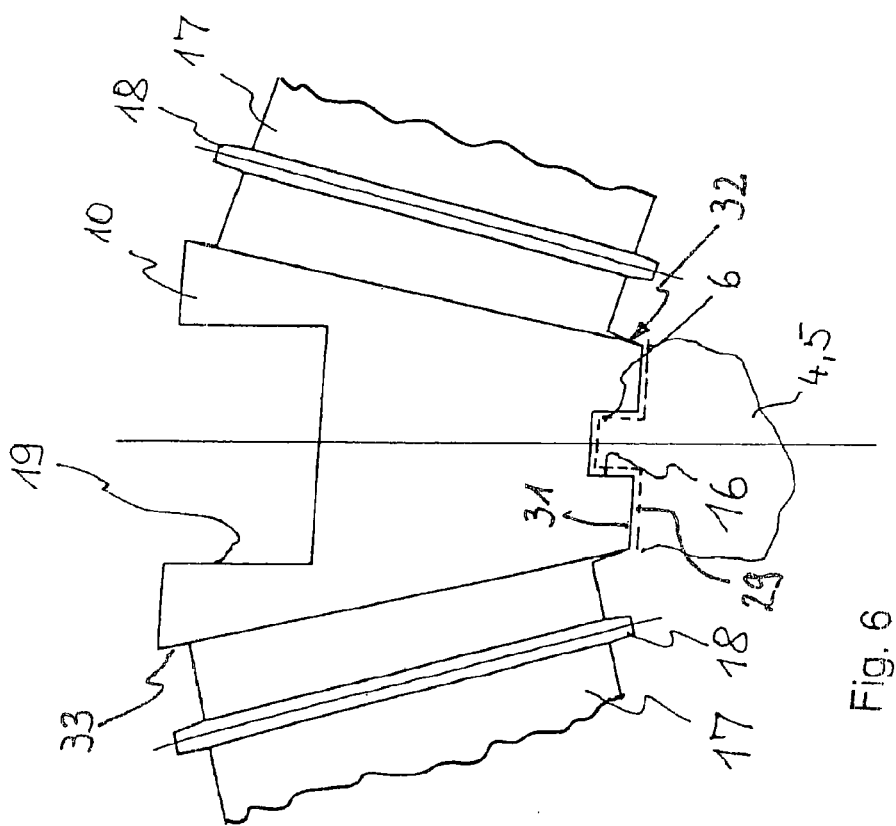

The profiles of the surfaces 31 belonging to the fastening elements 10, 11 may be either provided with a notch 16, as is shown in FIG. 6, or as is shown in FIG. 5 with a spring 15, while the profiles of the surfaces 29 belonging to the star's front facing arms 4, 5 may exhibit an accordingly form-fitted spring 6 (see FIG. 6) or a notch (see FIG. 5).

Figure 5A:
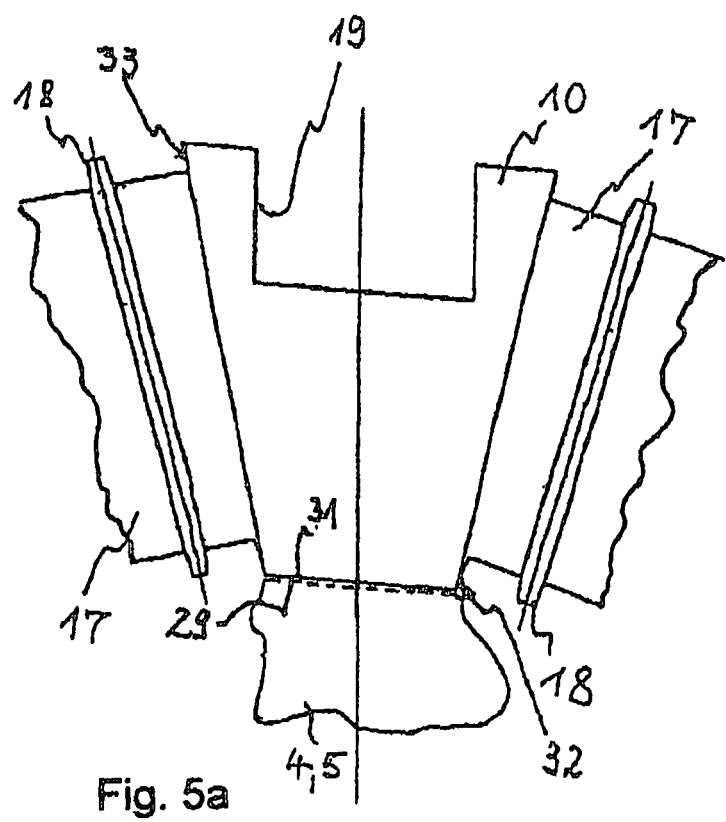
Figure 7A:
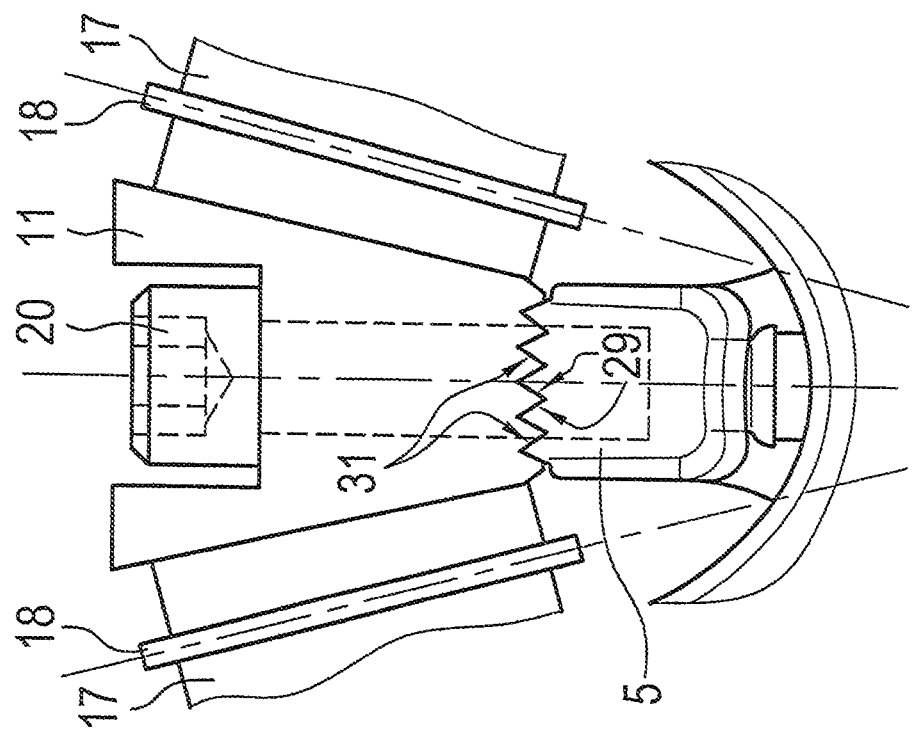
Figure 6A:
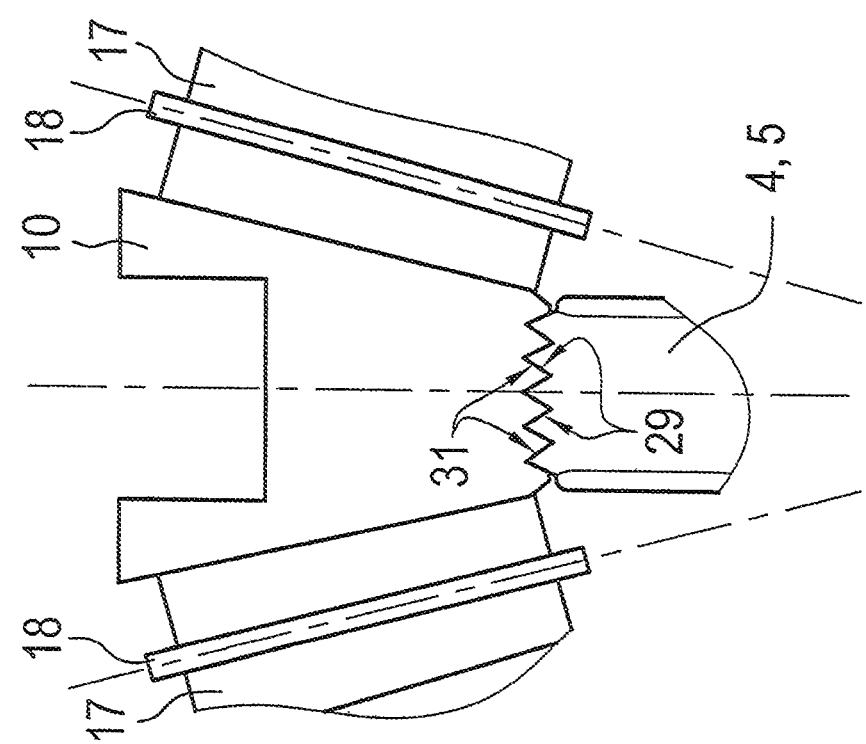

(compare FIGS. 5a, 6a, and FIG. 7a)

The profiles of the surfaces 31 belonging to the fastening elements 10, 11 may be composed of a coupling gear system (not included in the drawing), which exhibits a wedge- or gear-shaped design with the profiles of the surfaces 29 belonging to the star's front facing arm units 4, 5 may be provided with an accordingly fitting coupling gear system.

The profiles of the surfaces 31 belonging to the fastening elements 10, 11, as well as the profiles of the surfaces 29 belonging to the star's front facing arm units 4, 5 may exhibit a form-fit shape at both ends.

Figure 8:
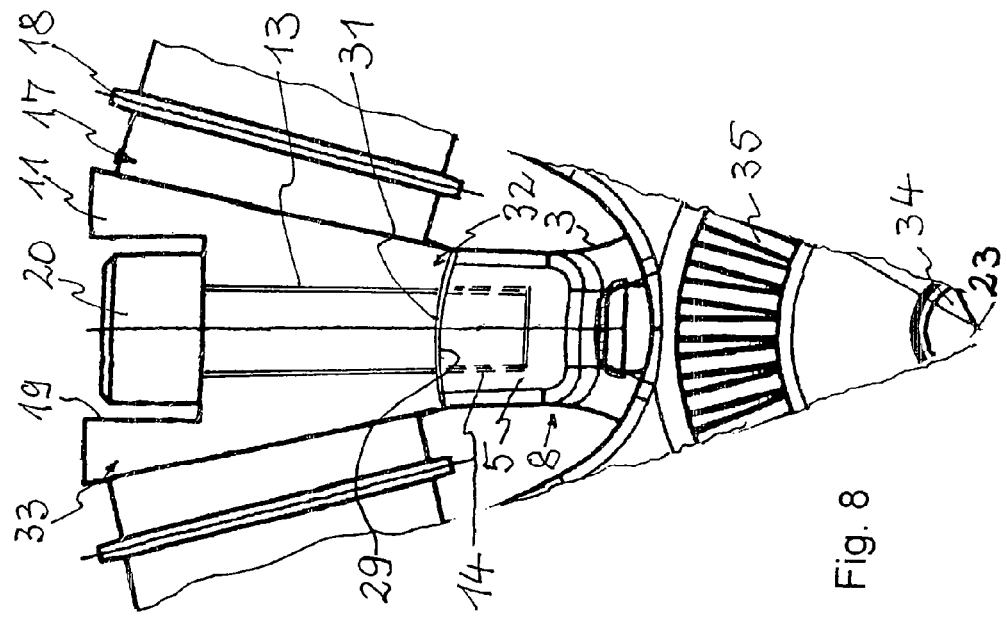

The profiles of the surfaces 31 belonging to the fastening elements 10, 11 as well as the profiles of the surfaces 29 belonging to the star's front facing arm units 4, 5 may (according to FIG. 7), be designed as correspondingly aligned, even surfaces or (according to FIG. 8) designed as correspondingly aligned, bent surfaces, which, in both cases contact each other during the implementation of the assembly.

Regarding the bent surfaces, it must be considered that the surfaces 31, 29 aligned towards the internal ring section 36 or the external ring section 37 may exhibit a bent shape.

The screw-joints 20 will generally lead to a force fit between the coupling ring 1 and the coupling parts 8, 9, which is usually supported by the form locking connections (spring, notch). As a rule of thumb, the connection area between the coupling ring 1 and the two coupling parts 8, 9 assigned to the coupling 30 exhibits a mixed form.

All fastening elements 10, 11 made of metal compounds may (according to FIG. 5 and FIG. 6, as well as according to FIG. 7 and FIG. 8) exhibit (preferably) external insertions/clearances 19 at the wedge-shaped, wide end range 33, which can either be designed in the form of a countersink notch or a counter bore for the radially aligned screw-joints 20.

The spring parts 17 may consist entirely of rubber. The spring parts 17 may, as shown in FIG. 1, however also be provided with at least one even supporting plate 18 aligned towards the ring axis 23.

The radially aligned supporting plates 18 may be arranged in a manner that is oriented to the center of the spring element.

Figure 7:
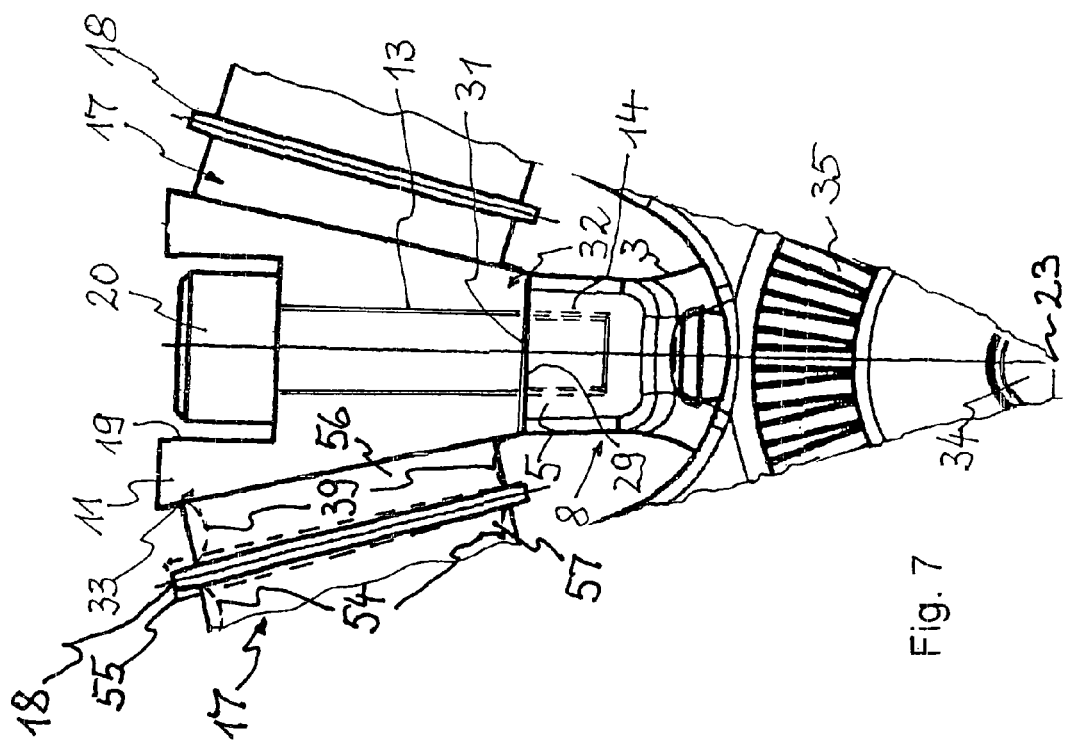

As is shown by means of a spring element 17 in FIG. 7, it is not of necessity that the supporting plates 18 are provided exclusively with parallel consistent, thus even surfaces, but also with surfaces exhibiting a wedged shape 55 (dotted) towards the ring axis 23. Apart from that, the spring elements 17 with their radial and/or axial alignment towards the ring axis 23 must exhibit at least one concave center, whereas the respective part 56, 57 of the spring element belonging to both sides of the supporting plate 18 (as shown in FIG. 7) must be provided with both an axially aligned concave center 39 (dotted) in the internal ring section and a concave center 54 in the external ring section. Concave centers fastened to the sides of the shafts (not included in the drawings) may be radially aligned towards the ring axis 23.

The screw-joints 20 may be, by turns and with the starting point positioned at the primary fastening element 10 belonging to the coupling ring 1, connected with the star's front facing arm unit 4 of the primary star 2, whilst, on the other hand, the screw-joint must be connectable with the fastening element 11 positioned next to the fastening element 11 and the star's front facing area 4 which is adjacent to the star 2 and the star 3 of the star's front facing area 5. This allows, in turn, for the mounting of another fastening element 10 in order to connect another star's front facing unit 4 with the star 2, etc. so that, after all, the coupling ring 1 is radially mounted onto the intermeshing coupling parts 8, 9 belonging to the internal ring section 36.

Figure 9:
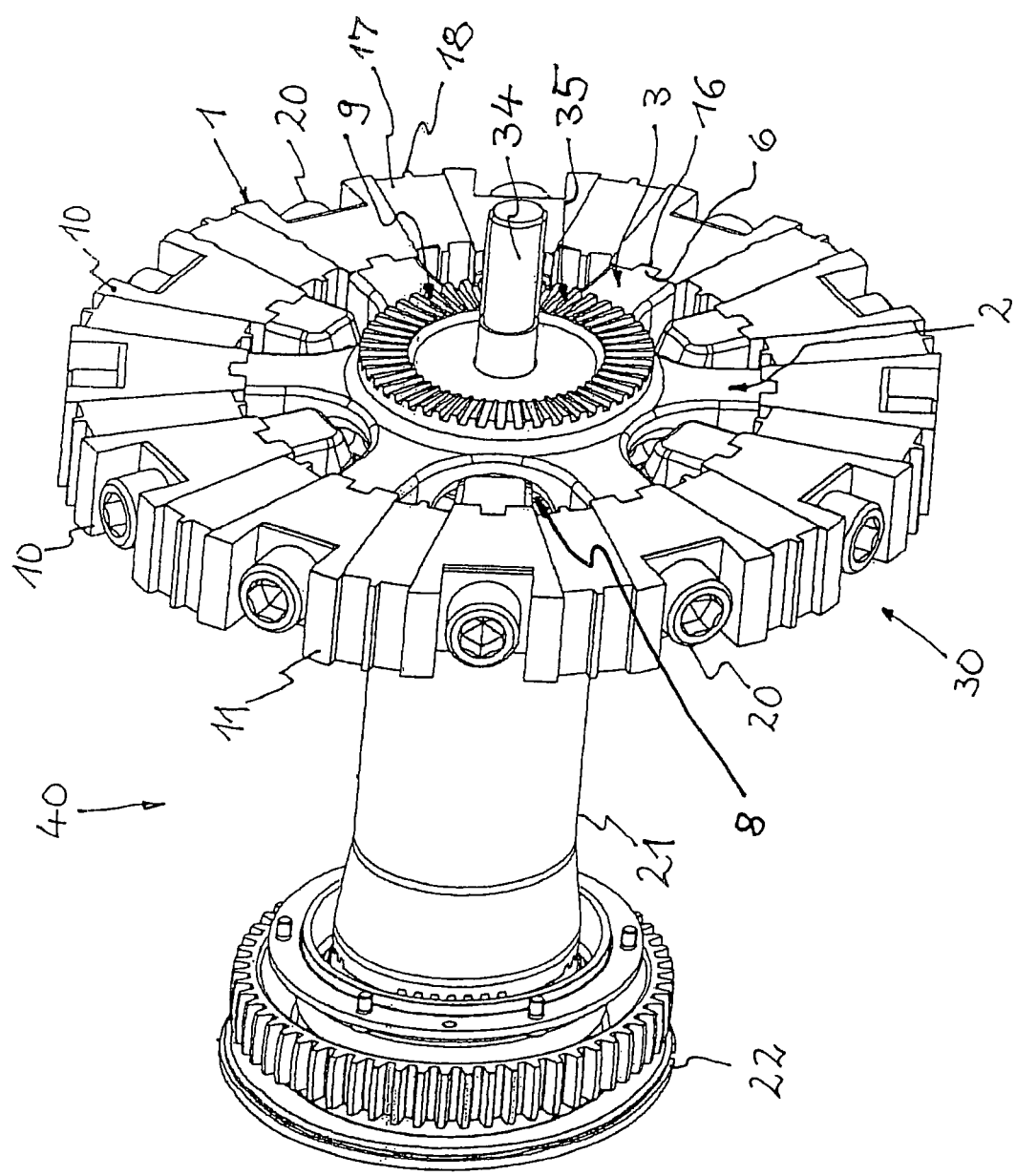
FIG. 9 a perspective depiction of the elastic, unsplitted coupling ring with wedges arranged along it in connection with an unsleeved open gear coupling, FIG. 10 a perspective depiction of a simple gimbal shaft bogie-coupling arranged along it, FIG. 11 a schematic sectioning of an (in accordance with the invention) double-joint coupling—gear coupling/bogie-coupling arranged along it—in idle state, FIG. 12 a schematic sectioning through the double-joint coupling in deflected position based on the description of FIG. 11, FIG. 13 a schematic depiction of a gimbal double-joint coupling in accordance with the descriptions of FIG. 9 and FIG. 10 designed for rail vehicles with each of them exhibiting one bevel quill ring whose starting point is at the gear coupling and exhibits one bevel, which is, in turn, connected to driving end's gear and FIG. 14 comes with a double-gimbaled bogie-coupling arranged along it, FIG. 15a schematic view of a coupling ring according to the present invention of the coupling ring construction, FIG. 16a schematic side elevational view of a coupling ring.
Figure 10:
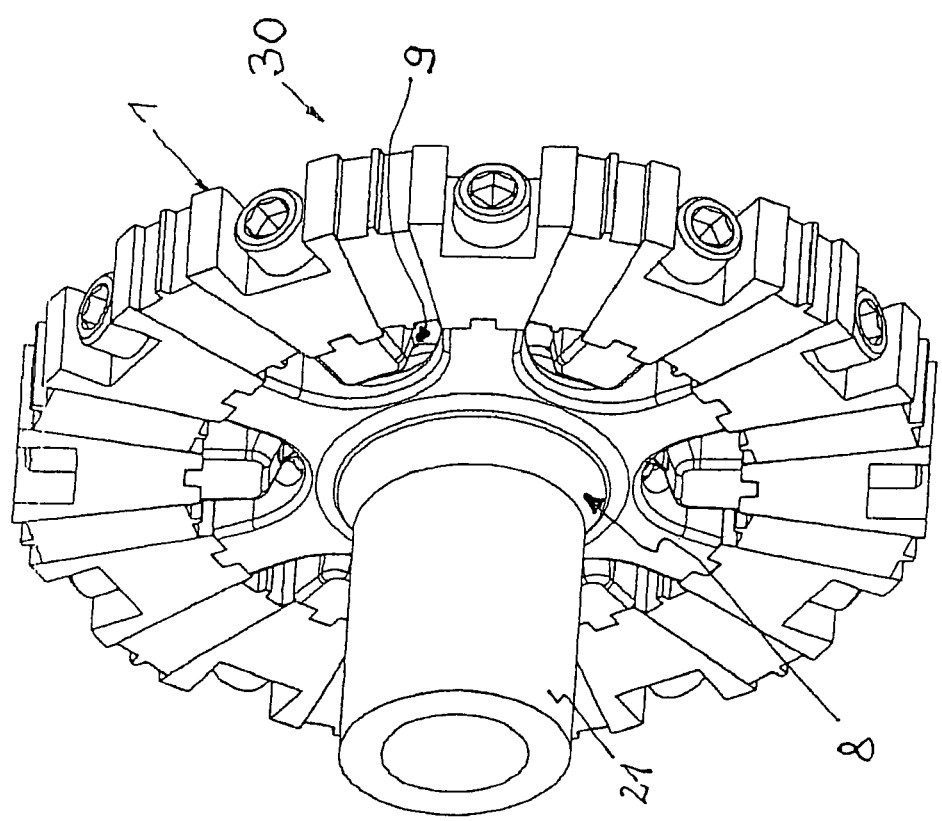

The couplings 40 and 30 depicted in FIG. 9 and FIG. 10 with their coupling ring 1 mounted onto two coupling parts 8, 9 may be part of a double-joint coupling 40, whereas one of the coupling parts 8 depicted in FIG. 9 is connected with a spherically geared coupling 22 through the shaft 21.

For explanation purposes, FIG. 10 depicts a single-gimbal bogie-coupling arranged along it 30 together with the inventive coupling ring 1, and including the connection of the coupling ring 1 via the coupling component 8 through to the shaft 21.

Figure 11:
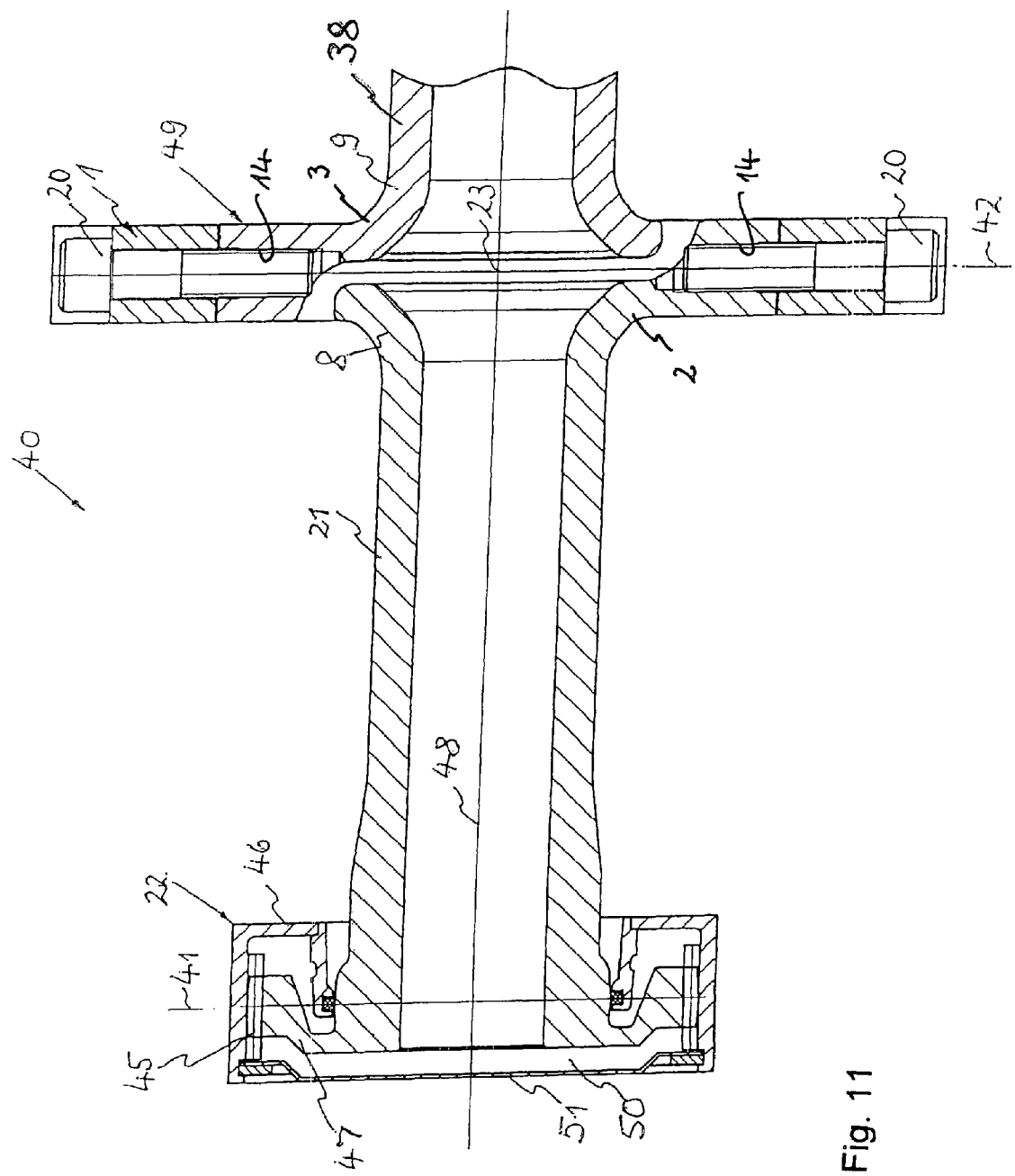
Figure 12:
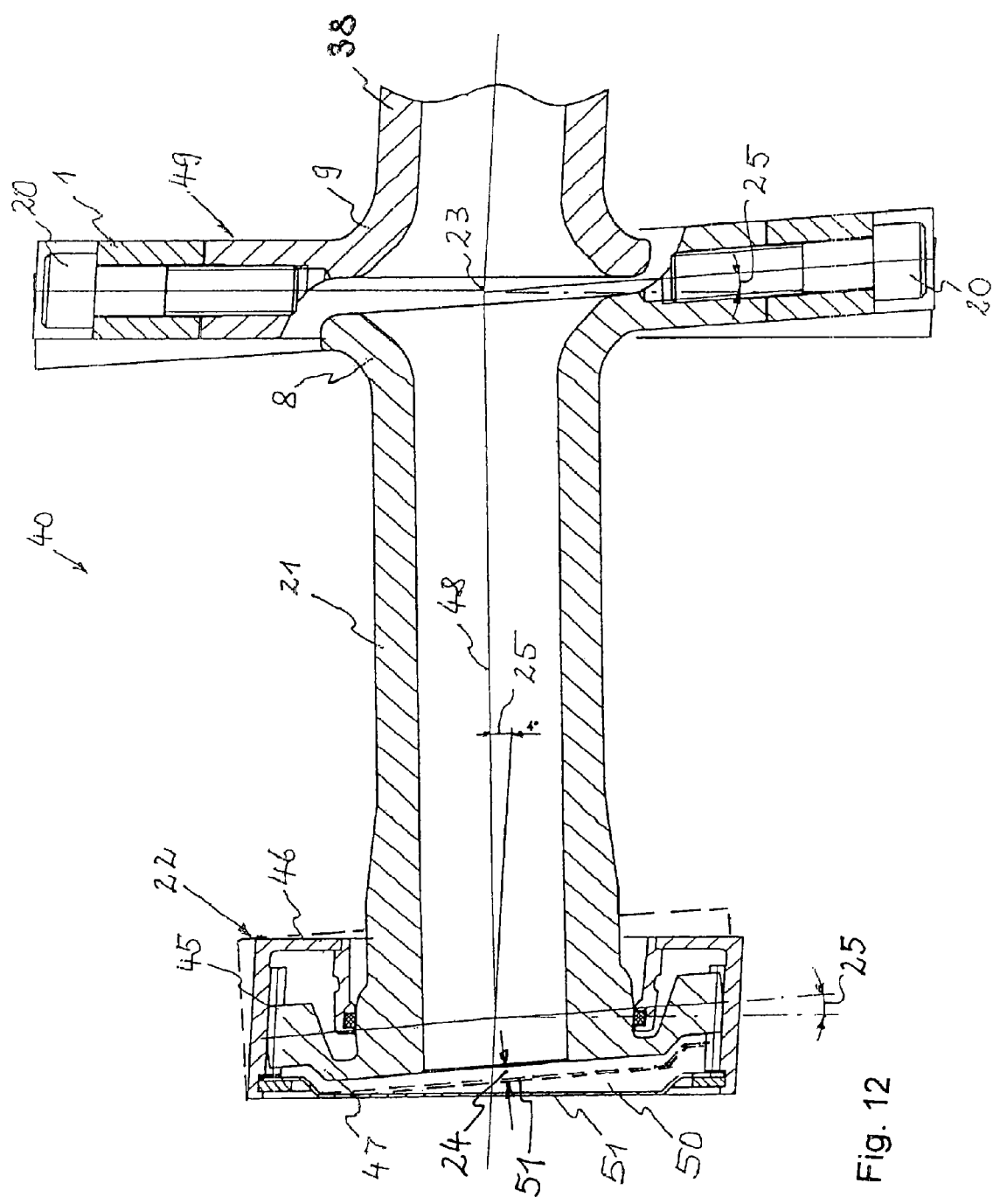

FIG. 11 shows the gimbal double-joint coupling 40 with two joint planes 41, 42 depicted in a non-deflected idle position, while FIG. 12 shows the gimbal double-joint coupling in a deflected, thus dynamic condition. However, the gimbal double-joint coupling 40 consists of two couplings 22, 49, which are connected through a shaft 21 with one of the joint planes 41 being assigned to a gear coupling 22 which is based on a spherical gear system 45 that provides for both angular and axial compensation. The other joint plane 42 is assigned to the torsion-proof, bending-elastic coupling 49 with its coupling ring 1. Compared to the coupling 30, the coupling 49 is provided with a shaft 38, which is connected with the coupling part 9.

The gear coupling 22, which is based on a spherical gear shaft system 45 exhibits a replaceable sleeve 46 along with an internal gear shaft system and a replaceable coupling notch 47 including an external gear shaft system, whereas the shaft 21 exhibits an end range-sided connection to the optionally replaceable coupling notch 47 with the torsion-proof, bending-elastic coupling 49 constituting a bogie-coupling arranged along it, and thus, in accordance with the invention, serves the purposes of an elastic, whole wedge-included coupling ring 1.

Figure 13:
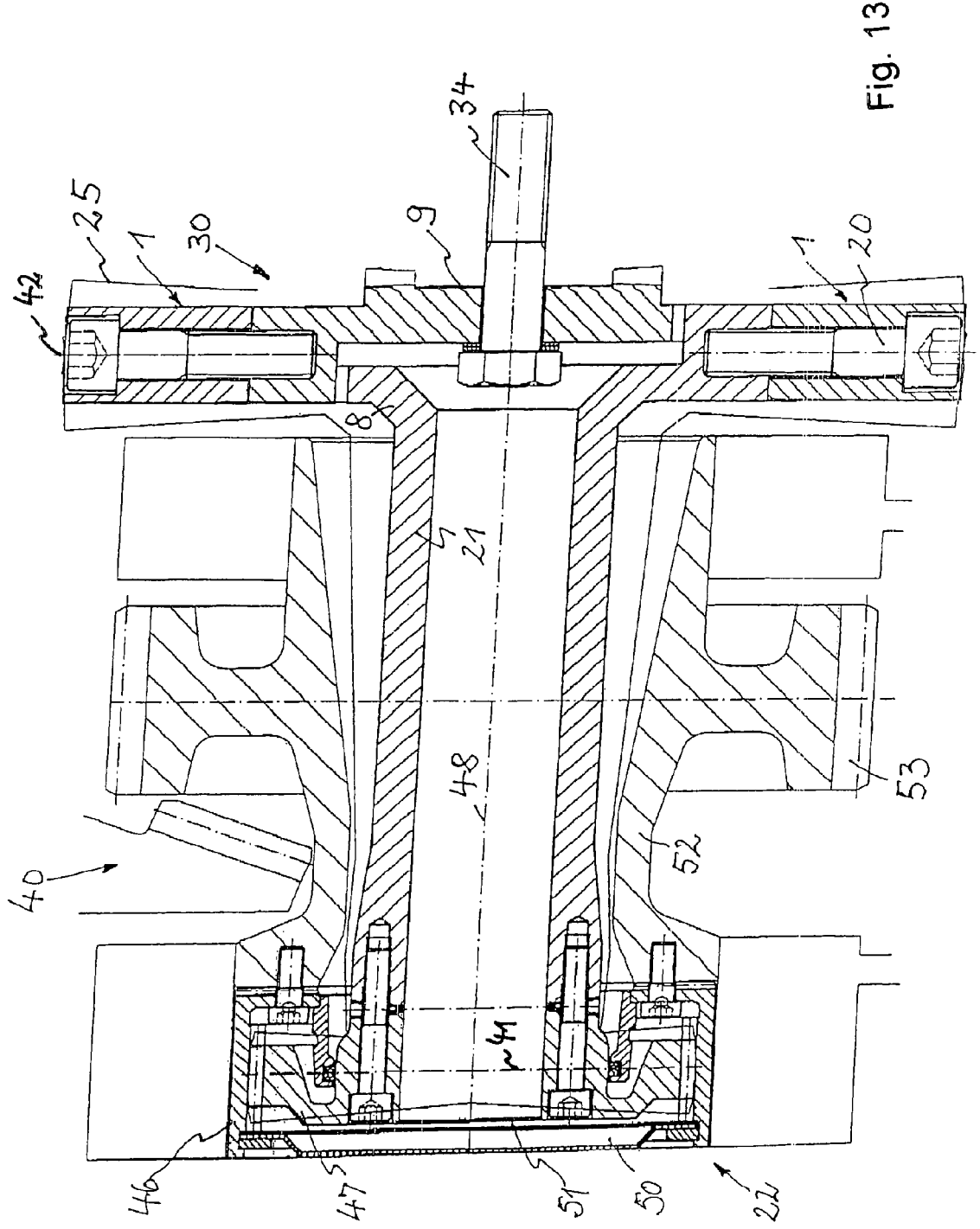

The gear coupling 22 with its spherical gear shaft system 45 as is shown in FIG. 11, FIG. 12, and FIG. 13 is enclosed by the sleeve 46, which is provided with a lid 51 that allows for a lubrication covering the full surface, with the lubricant or grease mainly filling the gap 50 between the gear shaft system's notch 47 and the lid 51 or the sleeve 46. According to requirements, the sleeve 46 can be a closed sleeve.

The double-joint coupling 40 depicted in FIG. 11 and FIG. 12 comes with the standard coupling ring 1 as in accordance with the invention being composed of an unsplitted and non-segmented coupling ring with its wedges arranged along it exhibits a consistent, thus coherent shape and is mounted in the inside of the fastening elements 10, 11 as well as in the inside of the elastic spring parts 17. Its purpose is to serve as a basis for screw-joints, which, in turn, leads to the generation of a pretension on two opposing, angularly shifted stars 2, 3 with axially shifted star front-facing areas each exhibiting at least one threaded borehole 14 for above-mentioned screw-joints. Each of the star front-facing areas 4, 5 exhibits a profile 6, 7, which is axially aligned to the axis 23 of the coupling 1, whereas the stars 2, 3 come with a respectively assigned coupling part 8 at the driving end and a coupling part 9 at the output end, whereas the coupling ring 1 is provided with several wedge-shaped, metallic fastening elements 10, 11 which are aligned towards the axis 23 and a continuous bore 12, 13 which is radially aligned to the ring axis 23. The continuous boreholes 12, 13 are intended for at least one direct radially aligned screw-joint 20 in order to enable for the fastening to the threaded boreholes 14 of the alternatingly arranged star's front facing are as 4, 5, which are, in turn, aligned in radial direction towards the ring axis 23, the wedge-shaped fastening elements 10, 11 exhibit profile 15, 16 running axially along the ring axis 23, and which must be each adjusted in correspondence with the profile 6,7 of the star front facing areas 4, 5 during the implementation of the assembly, each one of the elastic spring elements 17 must be provided between the ring-revolving adjacent fastening elements 10, 11 with the respective spring element providing to be bonded to the fastening elements by means of vulcanization, i.e. in the course of this process, as a result of a vulcanization process, the ring-revolving, alternating arrangement of the metallic fastening elements 10, 11 and the elastic spring parts 17 should provide for the formation of a bogie-coupling, in order to be mountable as a whole onto the star-intermeshing, axially shifted star's front facing areas 4, 5.

Provided that the fastening elements 10, 11 of the coupling ring 1 exhibit a wedge-shaped alignment towards the ring axis 23, the coupling ring 1 is referred to as a bogie-coupling.

Yet, the coupling ring 1 may also exhibit a ring-revolving combination consisting of fastening elements 10, 11 and in-vulcanized spring elements 17 which are arranged in an alternate pattern with the fastening elements 10, 11 and the spring elements 17 being provided with different, yet, correspondingly aligned shapes.

Both the elastic bogie-coupling arranged along it 30 and the bogie-coupling 1 shown in FIG. 10 depict a single-gimbal bogie-coupling arranged along it.

Figure 14:
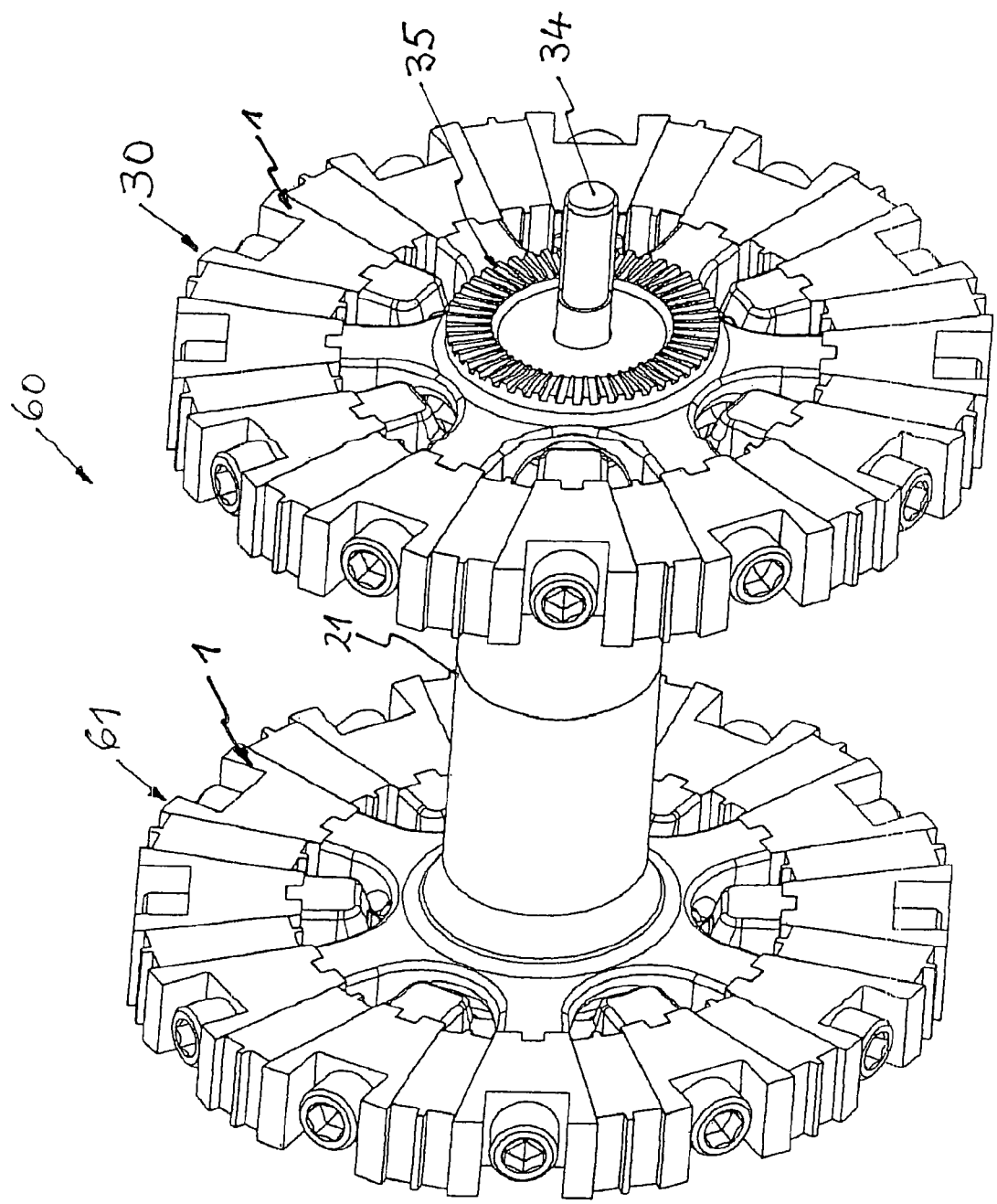

Two elastic couplings with wedges arranged along them 30, 61 may (in accordance with FIG. 14 have the shape of a shaft connection 21 based double-gimbal bogie-coupling arranged along it.

Apart from that, the gear coupling 22 with its spherical gear shaft system 45 may be substituted by means of a membrane coupling or ring disk coupling.

The arrangement of the two couplings 22, 30 mounted in their joint planes 41, 42 as is shown in FIG. 13, can be mounted as well into the internal as into the external area of the wheelset in rail vehicles.

In conclusion, it can be said that the coupling with its coupling ring 1, as is shown in FIG. 11, 12, 13, is at least partly connected with a double-joint coupling 40, yet, as is shown in FIG. 11, 12, 13, a connection must exist at least between one of the coupling parts 8 or 9 and a shaft connection 21 based gear coupling system 22 with its spherical gear shaft system 45 or the connection is formed by a double-joint coupling 60, as is shown in FIG. 14, i.e. through a shaft 21, that provides for the connection with the coupling 30, 61 via a coupling ring which corresponds with the type of assembly of the coupling ring 1 or via another coupling with optional gimbal misalignment and whose connection is formed through a shaft 21.

When it comes to the use of the elastic-unsplitted coupling ring 1 for applications in the field of double-joint couplings 40, the coupling ring 1 can be connected with a coupling component 8, as is shown in FIG. 9. In this case, the coupling component 8 of the coupling 30 must provide a connection with the shaft connection 21 based gear coupling system 22 that comes along with a spherical gear shaft system.

The advantages of the inventive, elastic-unsplitted coupling ring 1 with its consistently tangential pretension in two coupling parts 8, 9 within one coupling 30 are shown in the simultaneously conducted vulcanization process, which includes the fastening of all spring parts 17 to the adjacently positioned fastening elements 10, 11, and the consistent compensation resulting from said process, as well as in the non-necessity of an assembly device required for the consistent pretension on the stars 2, 3 belonging to the coupling parts 8, 9.

The following section provides an overview of the functionalities with respect to the double-joint coupling 40 as is shown in FIG. 12:

FIG. 12 depicts the gimbal double-joint coupling 40 in a dynamic condition including an axial misalignment 24 and an angular shift 25. In case of the axial misalignment 24 belonging to the gear coupling system 22, the latter one is shifted towards the coupling with the wedges arranged along it 49, with the coupling notch 47 being placed into the clearance 50 in the area of the lid 51 or the sleeve 46.

At the simultaneously occurring angular shift 25, the shaft 21 tilts out of the clutch coupling axis 48 with the coupling ring with the wedges arranged along it 1 serving as a suspension for the angular shift 25.

The inventive double-joint coupling 40 allows for the effective and efficient use of the advantages—long life fatigue strength and freedom from maintenance. Other advantages include the low space requirements along with a high level of angular and axial compensation and the possibility for lubrication of controllable parts within the wheelset in the two different couplings 22, 49.

For instance, it is possible to install the bogie-coupling arranged along it 49 in an externally mounted single-wheel drive, such as is the case with tram systems, i.e. right between the wheel and the transmission gear (as these generally have a narrow space), but also directly above the road (where the surroundings are rather aggressive). Owing to the low maintenance requirements and considering such surroundings, the described arrangement of the coupling 49 turns out to very useful. The inventive double-joint coupling 40 provides the opportunity to align the drives of rail vehicles in a much more diversified and flexible way towards the environmental and technical conditions.

On the other hand, the gear coupling 22 with its spherical gear shaft system 45 can be positioned in the protected area of the transmission gear, as this area provides for sufficient space for adjustments and shifts. The gear coupling 22 with its spherical gear shaft system 45 allows for coverage through the lid 51 or the sleeve 46, which is immovable and, thus, ensures coverage of the external surface.

The double-joint coupling 40 allows for a simple replacement of coupling parts applying to both areas the gear coupling 22 with its spherical gear shaft system 45 and the coupling with the wedges arranged along it 49 with the invention providing for an improved damping, an electrical isolation, plus enhanced flexibility in the misalignment resp. shifting areas 24, 25.

FIG. 13 is a schematic depiction to explain the way of the application of the double-joint coupling 40 (as is shown in the FIG. 11 and FIG. 12) for rail vehicles each provided with one bevel quill ring 52, which is, however, based on the more specific, thus completed drawing of the gear coupling 22. The latter encloses the shaft 21 and exhibits a bevel 53, which is connected with the gear shaft (not included in the drawing) at the driving end. If the application is based on dynamic conditions, the angular shift 25 can be applied, too.

FIG. 14 depicts a double-gimbal bogie-coupling arranged along it 60 based on the bogie-coupling arranged along it 30 and another bogie-coupling arranged along it 61, whereas the aforementioned explanations may apply to both the bogie-coupling arranged along it 30 and the bogie-coupling 61 arranged along it.

Another field of application of the coupling ring 1 when used with double-joint couplings is the mounting of membrane couplings and ring disk couplings instead of gear couplings into the double-joint couplings.

The nature of the invention allows for the fixture of the coupling ring 1 by means of the direct radial screw-joint 20 belonging to the coupling ring 1 onto the axially shifted star's front facing areas 4, 5 of the coupling stars 2, 3, which are positioned below the fastening elements 10, 11 and exhibit radially aligned threaded boreholes 14, which are, in turn, diagonally aligned to the star centers. Furthermore, the distinct corresponding profiles 29, 31 serve as a supporting tool when it comes to the adjustment of the coupling ring 1 to the star's front facing areas 4, 5 of the coupling parts 8, 9.

Apart from that, the fastening elements 10, 11 may consist of rigid material, which may either be formed by means of metal or another rigid substance/agent/material.

The fastening elements 10, 11 belonging to the coupling ring 1 may, as is the case with the elastic spring elements 17, consist of various shapes, which correspond to the shapes of the fastening elements 10, 11.

In the cross-sectional area, the fastening elements 10, 11 may exhibit a profile, which is at least formed on two opposing sides, thus in the direction starting from the external to the internal mid-position of the ring side and/or across the whole ring surface.

The fastening elements 10, 11 may be aligned towards the ring axis 23 in a wedged shape with the wedge-shaped narrow end range 32 being positioned at the internal side of the shaft and the wedge-shaped wide end range 33 being positioned at the external side of the ring.

The spring elements 17 consist of elastic material, i.e. preferably rubber. The elastic spring elements 17 may, however, also contain at least one supporting plate, which is each incorporated by way of a topographic exterior form, e.g. rounded surface and not directly aligned between two spring elements towards the ring axis 23.

The spring elements 17 or parts 56, 57 of said elements may be formed with at least one radially and/or axially aligned concave center 39, 54 towards the ring axis 23.

INDEX OF REFERENCE SIGNS

1 Coupling ring
2 Primary star
3 Secondary star
4 Primary star front facing area
5 Secondary star front facing area
6 Spring of the star front facing area
7 Notch of the star front facing area
8 Primary coupling part
9 Secondary coupling part
10 Primary fastening element
11 Secondary fastening element
12 Primary bore
13 Secondary bore
14 Threaded borehole
15 Spring of the fastening element
16 Notch of the fastening element
17 Spring element
18 Radially aligned supporting plate
19 Countersink notch/Countersink bore
20 Radially aligned screw-joint/screwing operation
21 Shaft
22 Gear coupling with spherical gear system
23 Axis of coupling ring
24 Axial misalignment/shift
25 Angular misalignment/shift
26 Star arm of the (primary) star
27 Star arm of the other (secondary) star
28 Mid-position of star/center of the star
29 Surface of the star front facing area/profile
30 Single-gimbal bogie-coupling
31 Surface of the fastening element/profile
32 Wedge-shaped narrow end-range
33 Wedge-shaped wide end-range
34 Adjustment screw
35 Front end gear shaft
36 Internal ring section
37 External ring section
38 Other (secondary) shaft
39 Mid-position of a spring element/part of a spring element
40 Double-joint coupling
41 Primary joint plane
42 Secondary joint plane
45 Spherical gear system
46 Sleeve
47 Coupling hub
48 Coupling axis
49 Elastic bogie-coupling with shaft connection
50 Clearance
51 Lid
52 Bevel quill ring
53 Bevel
54 Mid-position of a spring element/part of the spring element
55 Wedged shape of a supporting plate
56 Part of a spring element
57 Part of a spring element
60 Double-gimbal bogie coupling
61 Elastic-gimbal bogie coupling

The invention claimed is:

1. Coupling (30, 49, 61; 40, 60) with coupling ring (1) on two coupling parts (8, 9), with each of the coupling parts (8,9) exhibiting a star (2, 3) with star arms (26, 27) and fastened star front facing areas (4, 5), while the two stars (2, 3) are positioned in an axially opposed and angularly shifted arrangement with the star front facing areas (4, 5) being provided with each one threaded hole (14) intended for screw-joints (20), whereas
 the coupling ring (1) must exhibit several, ring-revolving fastening elements (10, 11), which are aligned to the axis (23) of the coupling ring (1) with each one of them being provided with at least one radially aligned ring axis (23) towards the continuous bores (12, 13) that provide for at least one direct radially aligned screw-joint (20) for the fixture of the fastening elements (10, 11) to the radially aligned threaded boreholes (14) towards the ring axis (23) which are part of the alternately arranged stars at the star front facing areas (4,5) with
 each of the ring-revolving, adjacently arranged fastening elements (10, 11) exhibiting an elastic spring element (17) which is mounted between above-mentioned parts, each of the fastening elements (10, 11) of the coupling ring (1) exhibiting a surface (31), which is based on a ring axis (23) which is axially running and aligned towards the surface (29) of the star front facing areas (4, 5) during the implementation of the star front facing areas (4, 5) of which each belongs to a star (2, 3) and which are aligned with the fastening elements (10, 11) of the coupling ring (1) with each of the end ranges constituting one of the star arms (26, 27) based on one of the respective mid-position (28) of the star (2, 3) regarding this, the end ranges exhibit a surface (29), which is aligned towards the fastening elements (10, 11) with one contacting connection with the surface (31) at the internal end-range (32) of the respective fastening element (10, 11) being in place, the ring-revolving alternate arrangement of the fastening elements (10, 11) and the elastic spring elements (17), of which each are being fastened to the respectively adjacent fastening elements (10, 11) in the course of a simultaneously conducted vulcanization process, form a coupling ring (1), which is being developed in the vulcanization process taking place simultaneously, and which is screwed as a whole part onto the two axially shifted star front facing areas (4, 5), the formation of an elastic, wholly finished coupling ring (1) through the coupling ring, allowing for a consistently tangential pretension with the tangential pretension impacting the two axially opposed, angularly shifted stars (2, 3) of the two coupling parts (8, 9).

2. Coupling according to claim 1, characterized in that,
that the screw joints (20) are fixed in an alternate arrangement, based on the primary fastening element (10) of the coupling ring (1), that the fastening element (10) is connectable with the star front facing areas (4) of the primary star (2) so as to enable for a connection of the fastening element (11) positioned adjacent to the primary fastening element (10) with the star front facing area (5) positioned adjacent to star (2) belonging to the primary star front facing area (4) of the other star (3), which, in turn enables for the connection of another fastening element (10) with another star front facing area (4) belonging to the primary star (2), so that the coupling ring (1) is eventually being screwed onto all coupling parts (8, 9) belonging to the star front facing areas in a ring-revolving manner.

3. Coupling according to claim 1, characterized in that, that the fastening elements (10, 11) of the coupling ring (1) exhibit a wedge-shaped design that is based on a metal compound.

4. Coupling according to claim 3, characterized in that,
that all fastening elements (10, 11) are provided with external insertions/clearances (19) at a wedge-shaped wide end-range (33) with each of them exhibiting the design of a countersink notch or a countersink bore for the radially aligned screw joints (20).

5. Coupling according to claim 3, characterized in
that, that the coupling ring (1) exhibits the shape of a consistent, at least with respect to the inside of the fastening elements (10, 11), unsplitted and non-segmented coupling ring, and allows for the build-up of pretension to on two angularly shifted, opposed stars (2, 3) that exhibit axially shifted star front facing areas (4, 5) of which each must be provided with at least one threaded borehole (14) for screw joints, wherein the star front facing areas (4, 5) are each provided with a profile (29, 6, 7), which are axially aligned towards the axis (23) of the coupling ring (1) with each one coupling part (9, 8) being assigned to the stars (2,3), whereas several wedge-shaped metal fastening elements (10, 11), exhibit a ring-revolving arrangement which are directed towards the axis (23) of the coupling ring (1) with each of them providing at least one continuous bore (12, 13) which are directly aligned in a radial way towards the screw joint (20) in order to allow for the fastening of the fastening elements (10, 11) to the threaded boreholes (14), which are, in turn, radially aligned to the ring axis (23) of the alternately situated stars belonging to the star front facing areas (4, 5), the wedge-shaped fastening elements (10, 11) exhibit an axially running pro-file (15, 16) towards the ring axis (23), which are each adjusted in such a way that they fit with the profile (6, 7) belonging to the star front facing areas (4, 5) during the implementation of the assembly, each one of the elastic spring elements (17) is mounted between the ring-revolving, adjacent fastening elements (10, 11), which can be fastened to the adjacent fastening elements (10, 11) in the course of a simultaneously conducted vulcanization process, —the ring-revolving, alternated arrangement of the fastening elements (10, 11) along with the elastic spring elements (17) must enable the formation of a bogie-coupling ring (1) in the course of a simultaneously conducted vulcanization process, which must be mountable onto the both star-opposing, axially shifted star front facing areas (4, 5) and provide for a bogie-coupling (30, 49, 61).

6. Coupling according to claim 5, characterized in that, that the elastic bogie-coupling (30) along with its bogie-coupling ring (1) constitutes a single-gimbal bogie-coupling ring (1).

7. Coupling according to claim 6, characterized in that,
that an elastic bogie-coupling is substituted with a gear coupling (22) and its spherical gear coupling system (45), in order to enable the formation of a double-gimbal coupling (40).

8. Coupling according to claim 7, characterized in that, that the gear coupling (22) along with its spherical gear coupling system (45) is substituted with a membrane coupling or ring disk coupling.

9. Coupling according to claim 5, characterized in that, that two elastic bogie-couplings (30,61) are being formed to a double-gimbal bogie-coupling (60) by means of the connection with a shaft (21).

10. Coupling according to claim 1, characterized in that,
that the fastening elements (10, 11) of the coupling ring (1) exhibit various shapes as is the case with the elastic spring elements (17).

11. Coupling according to claim 1, characterized in that,
that each mid-position of the stars (2,3) assigned to the end ranges of the star front facing areas (4,5), of which each one is aligned to the fastening 30 elements (10, 11) and connected to the coupling ring (1) constitute correspondingly aligned end ranges belonging to the respective surface (29), which is aligned towards the connection with that surface (31) positioned at the wedge-shaped, narrow end range (32) of a wedge-shaped fastening element (10,11).

12. Coupling according to claim 1, characterized in that,
that the profiles of the surfaces (31) belonging to the fastening elements (10, 11) and the profiles of the surfaces (29) belonging to the star front facing areas (4, 5) constitute correspondingly aligned formations based on an intermeshing design.

13. Coupling according to claim 12, characterized in that, that the profiles of the surfaces (31) belonging to the fastening elements (10, 11) constitute a notch (16) or a spring (15) with the profiles of the surfaces (29) belonging to the star front facing areas (4, 5) constituting a corresponding intermeshing with respect to the spring (6) or notch (7).

14. Coupling according to claim 12, characterized in that, that the surfaces (31) belonging to the fastening elements (10, 11) constitute dog teeth in the shape of wedges with the profiles of the surfaces (29) belonging to the star front facing areas (4, 5) constituting matching dog teeth.

15. Coupling according to claim 1, characterized in that, that the profiles of the surfaces (31) belonging to the fastening elements (10, 11) and the profiles of the surfaces (29) belonging to the star front facing areas (4, 5) constitute matching, force-fitting formations.

16. Coupling according to claim 15, characterized in that, that each of the star front facing areas (4, 5) of the stars (2, 3) exhibit an axially aligned surface (29) including a profile, which is, prior to the screwing operation (20), and along with its profile positioned below the surface (31) at a wedge-shaped narrow end-range (32) with both surfaces
(29, 31) contacting each other and supporting a force fit during the implementation of an assembly.

17. Coupling according to claim 15, characterized in that, that the profiles of the surfaces (31) belonging to the fastening elements (10, 11) and the profiles of the surfaces (29) belonging to the star front facing areas (4, 5) constitute consistently aligned or matching bent or matching topographic surfaces, which contact each other during an assembly process and support a force-fit contact.

18. Coupling according to claim 15, characterized in that, that the fastening elements (10, 11) are fixed with the star front facing areas (4, 5) by means of pin(s) and fitting bolts.

19. Coupling according to claim 1, characterized in that, that a space situated between the coupling ring (1) and the two coupling parts (8,9) assigned to the coupling (30, 49, 61, 40, 60) exhibit a mixed form consisting of force-fit and form-fit parts.

20. Coupling according to claim 1, characterized in that, that the spring parts (17) consist of elastic material.

21. Coupling according to claim 20, characterized in that, that the spring elements (17) exhibit, at least, one supporting plate (18) that is aligned to the ring axis (23).

22. Coupling according to claim 1, characterized in that, that the coupling ring (1) exhibits a combination of fastening elements and in-vulcanized spring elements with both the fastening elements and the spring elements exhibiting various shapes.

23. Coupling according to claim 1, characterized in that, that the coupling (30) with its coupling ring (1) constitutes at least one part of a double-joint coupling (40,60) with, at least, one of the coupling parts (8, 9) exhibiting a connection to the same coupling ring that corresponds with a type of assembly used for the design of coupling ring (1) with the connection being made up of a gear coupling (22) along with a spherical gear system (45), which is fastened to a shaft (21) or with the connection being made up of another coupling allowing for gimbal misalignment and which is fastened to a shaft (21).

24. Coupling according to claim 23, characterized in that, that it exhibits a connection based on a double-joint coupling (40) including two joint planes (41,42), which are provided with two couplings that are connected through a shaft (21), with the primary joint plane (41) being assigned to a gear coupling (22) along with a spherical gear system (45) and allowing for both an angular and axial compensation, wherein the gear coupling (22) with its spherical gear system (45) comes with a sleeve (46), which is provided with internal teeth and a coupling hub (47) along with the corresponding external teeth, whereas the shaft (21) is connected with the coupling hub (47) and the secondary joint plane (42) is assigned to the coupling (30, 49) with its coupling ring (1).

25. Coupling according to claim 1, characterized in that, that an arrangement of couplings (22, 49) seated in their joint planes (41, 42) is mounted in both spaces of the wheelset in rail vehicles, in the external and in the internal range of the rail vehicle's wheelset.

26. Coupling ring characterized in that,
that the coupling ring (1) is formed in the shape of a consistent coupling ring, which exhibits the shape of an unsplitted and non-segmented coupling ring, at least within the space of the fastening elements (10, 11), whereas
the coupling ring (1) must exhibit several fastening elements (10, 11), which are aligned around the axis (23) of the coupling ring (1) with each of them providing a continuous bore (12, 13), which are directly aligned in a radial direction towards the ring axis (23) and enable the implementation of, at least, one directly radial screw joint (20) that is based on the external ring surface (37) so as to attach the fastening elements (10, 11) onto two aligned coupling parts (8, 9), and, eventually, provide the basis for the connection of the two coupling parts (8, 9) by means of the coupling ring (1), each of the fastening elements (10, 11) belonging to the coupling ring (1) at the internal ring surface (36) must exhibit an axially running profile towards the ring axis (23),
each of the ring-revolving adjacent fastening elements (10, 11) must exhibit an elastic spring element (17), which is fastened to the adjacent fastening elements (10, 11) in the course of a simultaneously conducted vulcanization process,
the ring-revolving alternate arrangement of the fastening elements (10, 11) and the elastic spring elements (17), of which each are being fastened to the respectively adjacent fastening elements (10, 11) in the course of a simultaneously conducted vulcanization process, form a coupling ring (1), which is being developed in the vulcanization process taking place simultaneously, and which is screwed as a whole part onto two aligned coupling parts (8, 9).

27. Coupling ring according to claim 26, characterized in that, that the fastening elements (10, 11) consist of solid material, such ones made exclusively of metal compounds.

28. Coupling ring according to claim 26, characterized in that, that both the fastening elements (10, 11) and the elastic spring elements (17) exhibit various shapes, which are aligned to the shapes of the fastening parts.

29. Coupling ring according to claim 28, characterized in that, that the profile of the fastening elements (10, 11) are, at least, on two opposing sides, from the external towards the internal ring side, provided with a correspondingly aligned mid-position and/or profile.

30. Coupling ring according to claim 26, characterized in that, that the fastening elements (10, 11) exhibit a wedged shape towards the ring axis (23) with the wedge-shaped narrow end-range (32) being positioned at the internal ring side and the wedge-shaped wide end-range (33) being positioned at the external ring side.

31. Coupling ring according to claim 30, characterized in that, the wedge-shaped wide end-range (33) of the fastening elements (10, 11) exhibit external insertions/clearances (19), which are respectively designed in the shape of a countersink notch or a countersink bore for the radially aligned screw joints (20).

32. Coupling ring according to claim 30, characterized in that, that each of the elastic spring elements (17) exhibit, at least, one supporting plate, which is formed in a topographic shape, embossed or rolled, and which is not exclusively or directly aligned to the ring axis (23) and positioned between each two spring elements,
   wherein the wedge, shaped fastening elements (10, 11) exhibit a profile (15, 16) running axially along the ring axis (23), and which must be each adjusted in correspondence with the profile (6, 7) of the star front facing areas (4, 5) during the implementation of the assembly.

33. Coupling ring according to claim 26, characterized in that, that the spring elements (17) consist of elastic material.

34. Coupling ring according to claim 33, characterized in that, that the elastic spring elements (17) exhibit, at least, one supporting plate(18), which is aligned to the ring axis (23) directed towards it.

35. Coupling ring according to claim 34, characterized in that, that the supporting plates (18) are designed in the shape of a wedge (55) and aligned towards the ring axis (23).

36. Coupling ring according to claim 33, characterized in that,
   that the spring elements (17) or its parts (56, 57) exhibit a concave mid-position (39, 54) with at least one ring axis (23) being radially and/or axially aligned to it.

* * * * *